United States Patent [19]
Takai et al.

[11] Patent Number: 5,194,354
[45] Date of Patent: Mar. 16, 1993

[54] LOW CRYSTALLINE OXYTITANIUM PHTHALOCYANINE, PROCESS FOR PRODUCING CRYSTALLINE OXYTITANIUM PHTHALOCYANINES USING THE SAME, OXYTITANIUM PHTHALOCYANINE OF A NOVEL CRYSTAL FORM AND ELECTROPHOTOGRAPHIC PHOTOSENSITIVE MEMBER USING THE SAME

[75] Inventors: Hideyuki Takai; Kazushi Iuchi; Itaru Yamazaki; Hajime Miyazaki, all of Yokohama, Japan

[73] Assignee: Canon Kabushiki Kaisha, Tokyo, Japan

[21] Appl. No.: 555,763

[22] Filed: Jul. 23, 1990

[30] Foreign Application Priority Data

Jul. 21, 1989 [JP] Japan .................. 1-189199

[51] Int. Cl.$^5$ .............................. G03G 5/06
[52] U.S. Cl. .................... 430/58; 430/78; 430/60; 430/66; 540/141; 355/200
[58] Field of Search ............ 430/58, 59, 78, 60, 430/66; 540/141; 355/200

[56] References Cited

U.S. PATENT DOCUMENTS

| | | | |
|---|---|---|---|
| 4,444,861 | 4/1984 | Nogami et al. | 430/58 |
| 4,664,997 | 5/1987 | Suzuki et al. | 430/58 |
| 4,728,592 | 3/1988 | Ohaku et al. | 430/59 |
| 4,898,799 | 2/1990 | Fujimaki et al. | 430/78 |
| 4,994,339 | 2/1991 | Kinoshita et al. | 430/60 |

FOREIGN PATENT DOCUMENTS

| | | |
|---|---|---|
| 59-166959 | 9/1984 | Japan . |
| 63-365 | 1/1988 | Japan . |
| 63-366 | 1/1988 | Japan . |
| 63-116158 | 5/1988 | Japan . |
| 63-198067 | 8/1988 | Japan . |
| 01-17066 | 1/1989 | Japan . |

*Primary Examiner*—John L. Goodrow
*Attorney, Agent, or Firm*—Fitzpatrick, Cella, Harper & Scinto

[57] ABSTRACT

There are disclosed low crystalline oxytitanium phthalocyanines which have characteristic strong peaks at specific angles of Bragg angle $2\theta \pm 0.2°$. Using the low crystalline oxytitanium phthalocyanines, it is easy to obtain oxytitanium phthalocyanines having novel crystal forms. Electrophotographic photosensitive member containing the oxytitanium phthalocyanines having novel crystal forms have a very high photosensitivity to beams of long wavelength, a ver high potential stability as well as excellent durability in repetitive use.

29 Claims, 14 Drawing Sheets

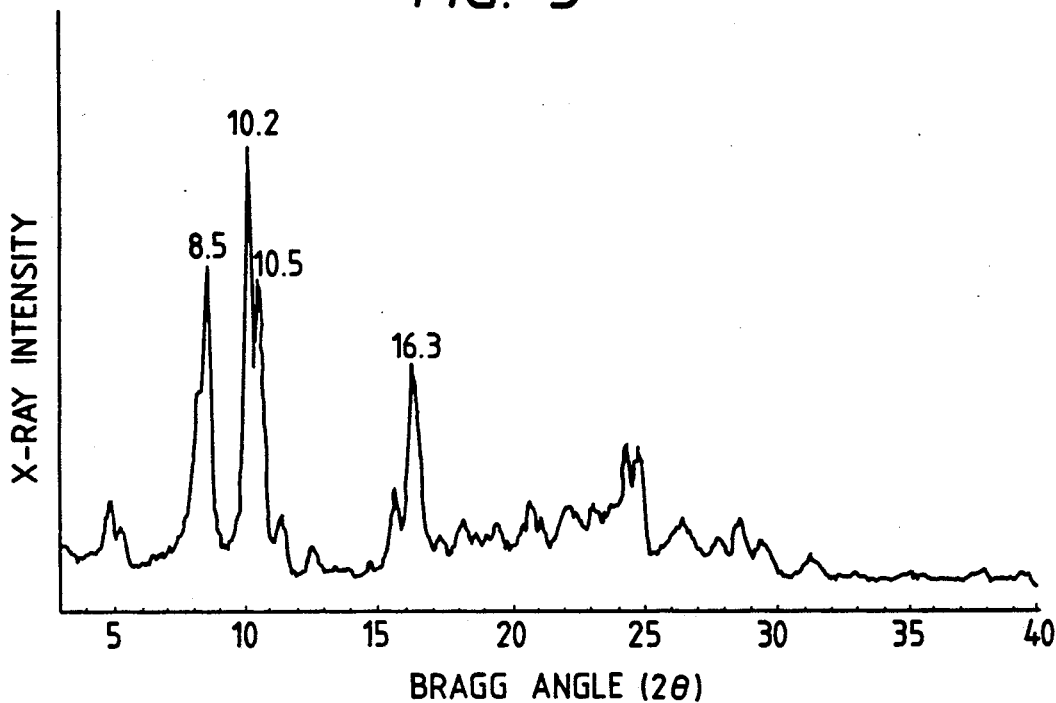
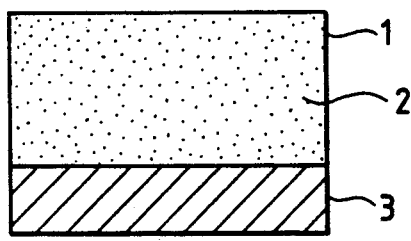
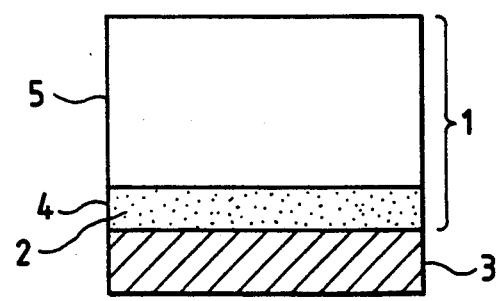

LOW CRYSTALLINE OXYTITANIUM PHTHALOCYANINE, PROCESS FOR PRODUCING CRYSTALLINE OXYTITANIUM PHTHALOCYANINES USING THE SAME, OXYTITANIUM PHTHALOCYANINE OF A NOVEL CRYSTAL FORM AND ELECTROPHOTOGRAPHIC PHOTOSENSITIVE MEMBER USING THE SAME

BACKGROUND OF THE INVENTION

1. Field on the Invention

This invention relates to a low crystalline oxytitanium phthalocyanine, an oxytitanium phthalocyanine of a novel crystal form obtained from the same and an electrophotographic photosensitive member using the same.

2. Related Background Art

Heretofore, phthalocyanine pigments have been regarded and studied as electronic materials for use in electrophotographic photosensitive members, solar cells, sensors, etc. besides coloring applications.

Non-impact type printers based on the application of the electrophotographic technique have been widely used as terminal printers in place of the conventional impact-type printers. The non-impact-type printers are mainly laser beam printers using a laser beam as a light source, where a semiconductor laser is used from the viewpoint of cost, size of apparatus, etc.

The semiconductor laser now mainly used has an oscillation wavelength which is as long as 790±20 nm, and thus development of electrophotographic photosensitive members having sufficient sensitivity to the beams of such long wavelengths has been conducted to date.

The sensitivity of electrophotographic sensitive members mainly depends upon the type of charge generation materials used.

Recently, studies have been made much on such charge generation materials having a sensitivity to the beams of long wavelength as metal phthalocyanines and non-metal phthalocyanines, for example, chloroaluminum phthalocyanine, chloroindium phthalocyanine, oxyvanadyl phthalocyanine, chlorogallium phthalocyanine, magnesium phthalocyanine, oxytitanium phthalocyanine, etc.

The presence of various crystal forms is known in many of these phthalocyanine compounds. For example. α-type, β-type, γ-type, δ-type, ε-type, χ-type, τ-type, etc. are known in the non-metalphthalocyanines and α-type, β-type, γ-type, δ-type, ε-type, χ-type, etc. are known for copper phthalocyanine.

It is also known that differences in the crystal forms have a large influence upon the electrophotographic characteristics (sensitivity, potential stability on the durability test, etc.) and also upon the paint characteristics when the phthalocyanine compound is made into a paint.

Many crystal forms are also known for oxytitanium phthalocyanine as having a particularly high sensitivity to the beams of long wavelengtb, as in the case of non-metal phthalocyanines, copper phthalocyanine. etc. For example, Japanese Patent Application Kokai (Laid-open) No. 59-49544 (U.S. Pat. No. 4,444,861), Japanese Patent Application Kokai (Laid-open) No. 59-166959, Japanese Patent Application Kokai (Laid-open) No. 61-239248 (U.S. Pat. No. 4,728,592), Japanese Patent Application Kokai (Laid-open) No. 62-67094 (U.S. Pat. No. 4,664,997), Japanese Patent Application Kokai (Laid-open) No. 63-366, Japanese Patent Application Kokai (Laid-open) No. 63-116158, Japanese Patent Application Kokai (Laid-open) No. 63-198067 and Japanese Patent Application Kokai (Laid-open) No. 64-17066 disclose oxytitanium phthalocyanines of different crystal forms.

However, since the processes for producing the conventional crystal forms use A-type crystal as a stable type [Japanese Patent Application Kokai (Laid-open) No. 62-67094 (U.S. Pat. No. 4,664,997)] or B-type crystal as a semi-stable type [Japanese Patent Application Kokai (Laid-open) No. 61-239248 (U.S. Pat. No. 4,728,592), or acid-pasted A-type or B-type crystal as a starting material, it is very difficult to obtain a novel crystal form, because fine control is required as a production condition or a special treatment is required.

SUMMARY OF THE INVENTION

An object of the present invention is to provide a low crystalline oxytitanium phthalocyanine capable of producing oxytitanium phthalocyanines of various crystal forms under simple production conditions or simple treatment conditions.

Another object of the present invention is to provide a process for producing various useful, crystalline oxytitanium phthalocyanines with ease.

Still another object of the present invention is to provide an oxytitanium phthalocyanine of novel crystal form.

Further object of the present invention is to provide an electrophotographic photosensitive member having a very high photosensitivity to beams of long wavelength.

A still further object of the present invention is to provide an electropbotographic photosensitive member having a very high potential stability, while retaining a good image when subjected to repeated durability tests.

A still further object of the present invention is to provide an electrophotographic photosensitive member having no memory to light even if exposed to a visible light for a long time.

That is, the present invention provides a low crystalline oxytitanium phthalocyanine showing strong peaks at Bragg angles $2\theta \pm 0.2°$ of 7.2°, 14.2°, 24.0° and 27.2° in the X-ray diffraction of $CuK_\alpha$.

Furthermore, the present invention provides a process for producing crystalline oxytitanium phthalocyanine, which comprises treating a low crystalline oxytitanium phthalocyanine showing strong peaks at Bragg angles $2\theta \pm 0.2°$ of 7.2°, 14.2°, 24.0° and 27.2° in the X-ray diffraction of $CuK_\alpha$ with an organic solvent.

Still furthermore, the present invention provides an oxytitanium phthalocyanine of crystal form showing strong peaks at Bragg angles $2\theta \pm 0.2°$ of 7.4°, 10.9° and 17.9° in the X ray diffraction of $CuK_\alpha$.

Still furthermore, the present invention provides an oxytitanium phthalocyanine of crystal form showing strong peaks at Bragg angles $2\theta \pm 0.2°$ of 7.6°, 9.7°, 12.7°, 16.2° and 26.4° in the X-ray diffraction of $CuK_\alpha$.

Still furthermore, the present invention provides an oxytitanium phthalocyanine showing strong peaks at Bragg angles $2\theta \pm 0.2°$ of 8.5°, 10.2° and 10.5° in the X-ray diffraction of $CuK_\alpha$.

Still furthermore, the present invention provides an electrophotographic photosensitive member, which comprises an electroconductive support and a photosensitive layer laid on the support, the photosensitive layer containing an oxytitanium phthalocyanine of crystal form showing strong peaks at Bragg angles $2\theta \pm 0.2°$ of 7.4°, 10.9° and 17.9° in the X-ray diffraction of $CuK_\alpha$.

Still furthermore, the present invention provides an electrophotographic photosensitive member, which comprises an electroconductive support and a photosensitive layer laid on the support, the photosensitive layer containing an oxytitanium phthalocyanine of crystal form showing strong peaks at Bragg angles $2\theta \pm 0.2°$ of 7.6°, 9.7°, 12.7°, 16.2° and 26.4° in the X-ray diffraction of $CuK_\alpha$.

Still furthermore, the present invention provides an electrophotographic photosensitive member, which comprises an electroconductive support and a photosensitive layer laid on the support, the photosensitive layer containing an oxytitanium phthalocyanine showing strong peaks at Bragg angles $2\theta \pm 0.2°$ of 8.5°, 10.2° and 10.5° in the X-ray diffraction of $CuK_\alpha$.

BRIEF DESCRIPTION OF THE DRAWINGS

FIGS. 3, 4 and 5 are X-ray diffraction diagrams of oxytitanium phthalocyanines of novel crystal form obtained in Applied production Examples.

FIGS. 6 and 7 are schematic cross-sectional views of layer structures of electrophotographic photosensitive members.

DETAILED DESCRIPTION OF THE PREFERRED EMBODIMENTS

Figure 1:
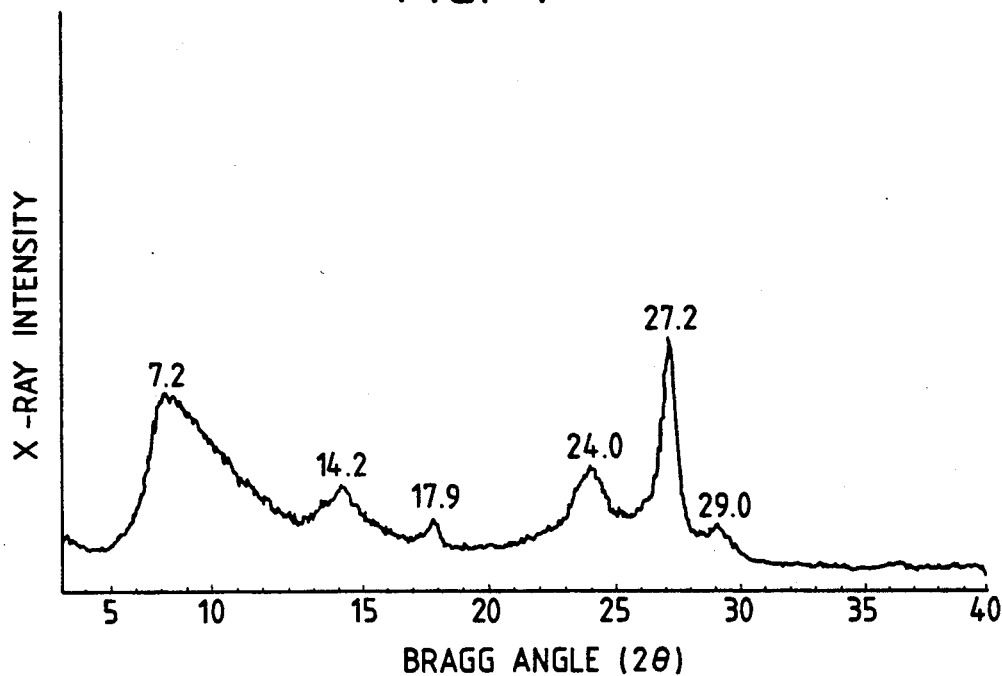
FIGS. 1 and 2 are X-ray diffraction diagrams of low crystalline oxytitanium phthalocyanines obtained in Production Examples according to the present invention.
Figure 2:
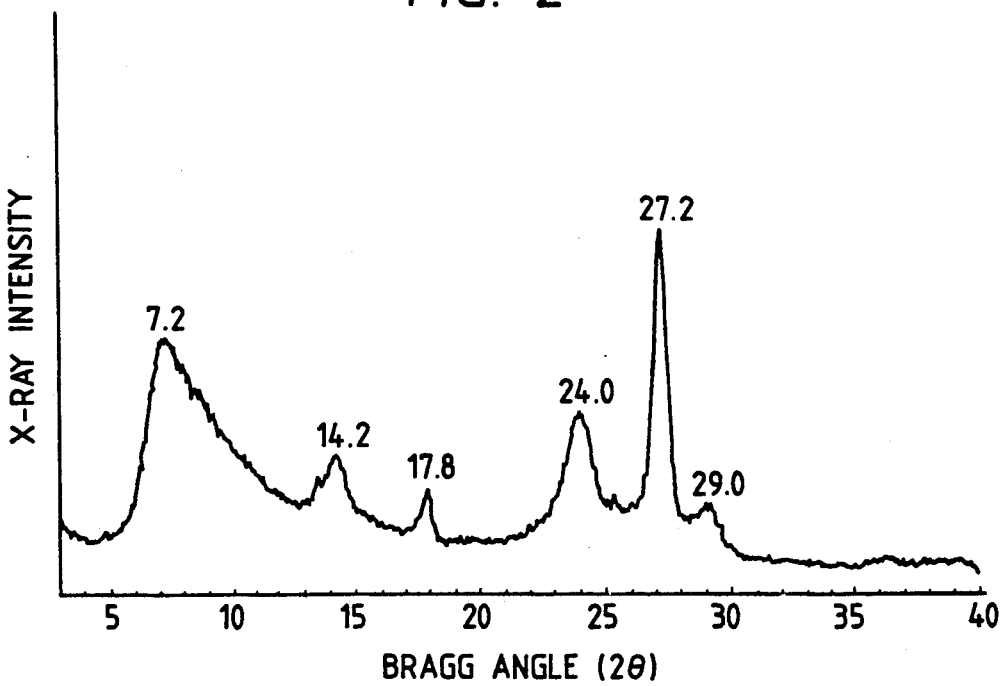

X-ray diffraction pattern of low crystalline oxytitanium phthalocyanine according to the present invention shows that there are strong peaks at Bragg angles $(2\theta \pm 0.2°)$ of 7.2°, 14.2°, 24.0° and 27.2°, as shown in FIGS. 1 and 2. These peaks are selected on four higher-level peaks with a high peak intensity and are main peaks.

What is characteristic of X-ray diffractions in FIGS. 1 and 2 is that the peak at 27.2° is the most intense and sharp peak and the peak at 7.2° has a next high intensity. Besides these four peaks, peaks of less intensity than those of those four peaks exist at 17.8° and 29.0°.

There are slight differences in the peak shapes of X-ray diffraction in the present invention owing to the low crystallinity of oxytitanium phthalocyanine, or differences in the production conditions or measurement conditions. For example, peak top edges are sometimes split or weak peaks appear near the peaks. For example, in case of FIG. 2, a small peak appears at about 13.5° around the peak at 14.2° and another split peak appears at about 27.3° at the top edge of peak at 27.2°.

The structure of the present oxytitanium phthalocyanines can be shown by the following structural formula:

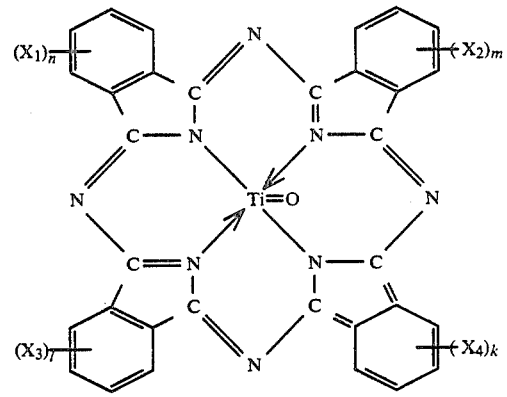

wherein $X_1$, $X_2$, $X_3$ and $X_4$ represent Cl or Br and n, m l and k are integers of 1 to 4.

An example of a process for synthesizing such oxytitanium phthalocyanines will be given below.

For example, titanium tetrachloride is made to react with orthophthalodinitride in α-chloronaphthalene to obtain dichlorotitanium phthalocyanine. Then, the dichlorotitanium phthalocyanine is washed with a solvent such as α-chloronaphthalene, trichlorobenzene, dichlorobenzene, N-methyl pyrrolidone, N,N-dimethyl formamide, etc., and then with such a solvent as methanol, ethanol, etc., and then hydrolyzed with hot water to obtain blue crystals of oxytitanium phthalocyanine.

The present low crystalline oxytitanium phthalocyanines can be readily obtained from the thus obtained oxytitanium phthalocyanine by subjecting amorphous oxytitanium phthalocyanine to a stirring treatment in methanol as a dispersing medium at room temperature for at least 30 minutes, preferably for at least one hour.

The amorphous oxytitanium phthalocyanine can be obtained by subjecting oxytitanium phthalocyanine A-type crystals disclosed in Japanese Patent Application Kokai (Laid-open) No. 62-67094 (U.S. Pat. No.

4,664,997), etc., oxytitanium phthalocyanine B-type crystals disclosed in Japanese Patent Application Kokai (Laid-open) No. 61-239248 (U.S. Pat. No. 4,728,592), etc., or mixtures of these A-type and B-type crystals, or other type oxytitanium phthalocyanine crystals to a dry pulverization treatment. For the dry pulverization, ordinary dispersing means such as a ball mill, a sand mill, a paint shaker, etc. can be used. Furthermore, amorphous oxytitanium phthalocyanine can be obtained according to an acid pasting method.

By treating the thus obtained low crystalline oxytitanium phthalocyanines of the present invention with various organic solvents, oxytitanium phthalocyanines of various novel crystal forms can be readily produced. Furthermore, the C-type crystals which are hard to produce [disclosed in Japanese Patent Applications Kokai (Laid-open) No. 63-365 and No. 63-366 can be readily obtained.

The present low crystalline oxytitanium phthalocyanines are very useful as precursors for the crystalline oxytitanium phthalocyanines. The organic solvent treatment herein mentioned means, for example, a heat treatment using an organic solvent as a dispersing medium, or a dispersion treatment including a stirring treatment. As the organic solvent, any one of the known solvents can be used, or a solvent mixture or a mixture with water can be used.

The organic solvents for use in the present invention include, for example, n-butyl cellosolve, metbyl cellosolve, diacetyl alcohol, 1,3-butanediol, methylcarbitol, ethylene glycol, propylene glycol, glycerine, mannitol, etc.

From the viewpoint of obtaining so far unknown, novel crystal forms, alcohol solvents and cellosolve solvents are particularly preferable. For the dispersion treatment, an ordinary dispersing means such as a ball mill, a paint shaker, a sand mill, etc. can be used.

Figure 3:
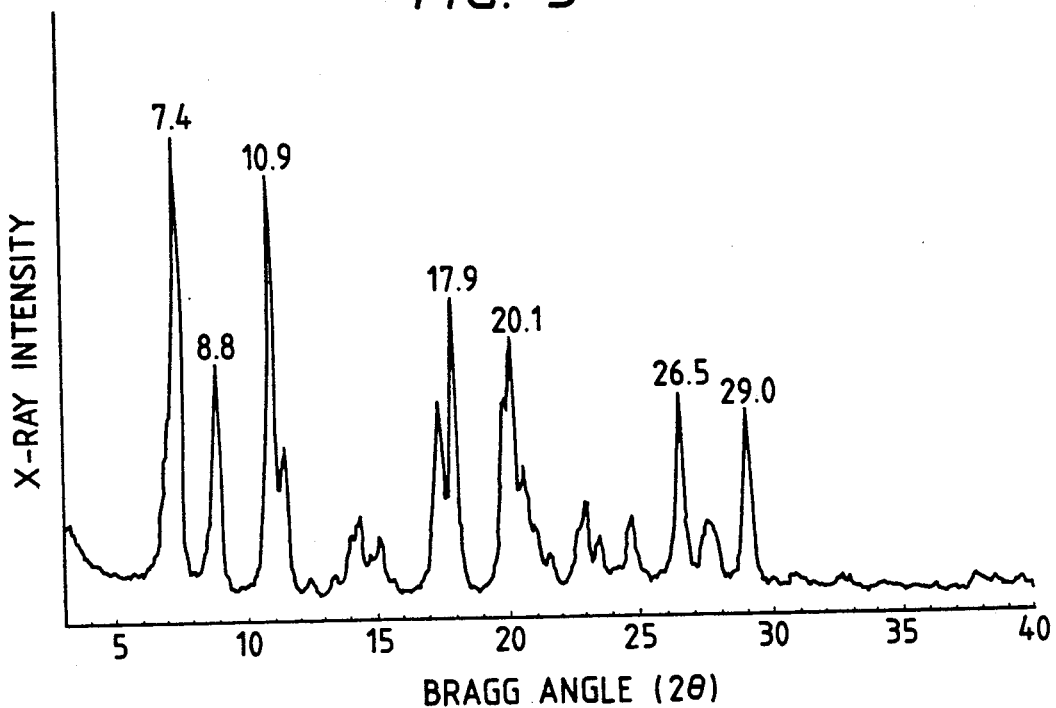

Examples of oxytitanium phthalocyanines of novel crystal forms obtained from the present low crystalline oxytitanium phthalocyanines will be given below:

(1) X-ray diffraction pattern of oxytitanium phthalocyanine shown in FIG. 3 has strong peaks at Bragg angles ($2\theta \pm 0.2°$) of 7.4°, 10.9°, and 17.9°. These three peaks are selected as higher-level peaks of a high peak intensity and are main peaks.

What is characteristic in the X-ray diffraction diagram of FIG. 3 is that all the three peaks are sharp peaks and have higher intensities at lower Bragg angles. There is a peak at 20.1° in succession to these three peaks, and also there are peaks at 8.8°, 17.4°, 26.5°, and 29.0° respectively.

The oxytitanium phthalocyanine of this novel crystal form can be obtained by subjecting the present low crystalline oxytitanium phthalocyanine to a dispersion treatment in an organic solvent such as methyl cellosolve, ethylene glycol, etc. at room temperature for at least 10 hours, preferably for at least 15 hours.

Figure 4:
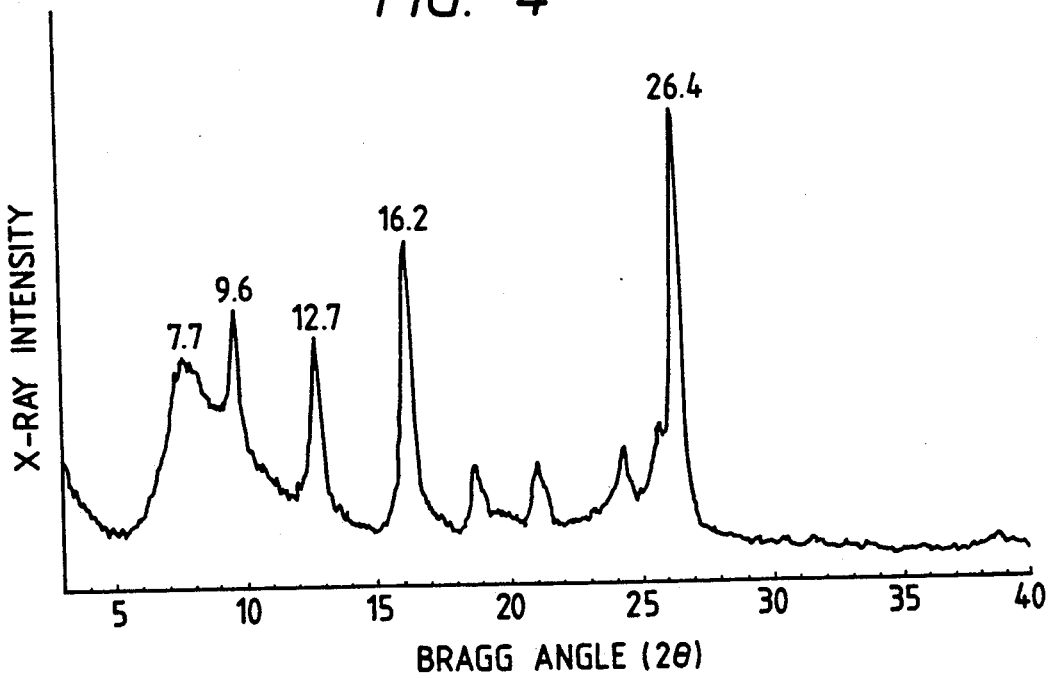

(2) X-ray diffraction pattern of oxytitanium phthalocyanine shown in FIG. 4 has strong peaks at Bragg angles ($2\theta \pm 0.2°$) of 7.6°, 9.7°, 12.7°, 16.2° and 26.4°. These 5 peaks are selected as higher-level peaks of a high peak intensity and are main peaks.

What is characteristic in the X-ray diffraction diagram of FIG. 4 is that the peak at 26.4° is the strongest and the peak at 16.2° is the second strongest.

The oxytitanium phthalocyanines of this novel crystal form can be obtained by subjecting the present low crystalline oxytitanium phthalocyanine to a dispersion treatment in an organic solvent such as propylene glycol, 1,3-butanediol, glycerine, etc. at room temperature for at least 10 hours, preferably for 15 hours.

(3) X-ray diffraction pattern of oxytitanium phthalocyanine shown in FIG. 5 has strong peaks at Bragg angles ($2\theta \pm 0.2°$) of 8.5°, 10.2°, and 10.5°. These 3 peaks are selected as higher-level peaks of a high peak intensity and are main peaks.

What is characteristic in the X-ray diffraction diagram of FIG. 5 is that the peak at 10.2° is the strongest. There is also a peak at 16.3° besides the foregoing peaks.

The oxytitanium phthalocyanines of this novel crystal form can be obtained by subjecting the present low crystalline oxytitanium phthalocyanine to a dispersion treatment in an aqueous solution of mannitol at room temperature for at least 10 hours, preferably for at least 20 hours, or to a heat treatment.

By treating the present low crystalline oxytitanium phthalocyanines with an organic solvent, oxytitanium phthalocyanines of various crystal forms can be readily produced.

The thus obtained crystalline oxytitanium phthalocyanines are excellent in the functions, for example, of photoelectric conductors and can be applied to electronic materials for electrophotographic photosensitive members, solar cells, sensors, switching devices, etc.

An example of applying the thus obtained oxytitanium phthalocyanines of the present invention to a charge generation material in an electrophotographic photosensitive member will be given below:

The basic layer structure of an electropbotograpbic photosensitive member comprises an electroconductive support 3 and a photosensitive layer 1 laid on the support 1, as shown in FIGS. 6 and 7. The photosensitive layer 1 may have a single layer structure containing a charge generation material 2 and a charge transport material (not shown in the drawing) as shown in FIG. 6 or a layered structure composed of a charge generation layer 4 containing a charge generation material 2 and a charge transport layer 5 containing a charge transport material, as shown in FIG. 7. In case of the double layer structure, the charge generation layer 4 and the charge transport layer 5 may be mounted in optional order.

The photosensitive layer of single layer structure as shown in FIG. 6 can be formed by mixing the charge generation material of the present oxytitanium phthalocyanine with the charge transport material in an appropriate binder resin solution, followed by coating and drying.

The charge generation layered of the photosensitive layer of the double layer structure as shown in FIG. 7 can be formed by dispersing the charge generation material of the present oxytitanium phthalocyanine into appropriate binder resin solution, followed by coating and drying. In this case, the binder resin may not be used.

The binder resin for use to this end includes, for example, polyester resin, acrylic resin, polyvinylcarbazole resin, phenoxy resin, polycarbonate resin, polyvinylbutyral resin, polystyrene resin, polyvinyl acetate resin, polysulfone resin, polyacrylate resin, vinylidene chloride-acrylonitrile copolymer resin, etc.

In case of the photosensitive layer of single layer structure, the layer thickness is 5 to 40 $\mu$m, preferably 10 to 30 $\mu$m, whereas in case of the photosensitive layer of layered structure, the thickness of charge generation layer is 0.01 to 10 $\mu$m, preferably 0.05 to 54 $\mu$m.

The present oxytitanium phthalocyanine crystals as a charge generation material may be mixed with other type of charge generation materials, depending upon the desired purpose.

The charge transport layer can be formed by dissolving a charge transport material and a binder resin into a solvent, thereby preparing a paint, followed by coating and drying of the paint.

The charge transport material for use to this end includes, for example, triarylamine compounds, hydrazone compounds, stilbene compounds, pyrazoline compounds, oxazole compounds, thiazole compounds, triallylmethane compounds, etc.

The same binder resins as mentioned above can be used as the binder resin.

A protective layer composed mainly of resin may be provided on the photosensitive layer 1 mainly to protect the photosensitive layer from an external shock, and an underlayer having a barrier function and an adhesive function may be also provided between the electroconductive support 3 and the photosensitive layer 1.

Material for the underlayer includes, for example, polyvinyl alcohol, polyethylene oxide, ethyl cellulose, methyl cellulose, casein, polyamide, glue, gelatin, etc.

The underlayer material is dissolved in an appropriate slovent and the resulting solution is applied to the electroconductive support 3. The thickness of the underlayer is 0.2 to 3.0 μm.

Furthermore, an electroconductive layer containing electroconductive particles dispersed in the resin may be provided between the electroconductive support 3 and the pbotosensitive layer 1 or the underlayer.

The layers composed mainly of the resin can be applied by dipping, spray coating, spinner coating, bead coating, blade coating, beam coating, etc.

Any material can be used for the electroconductive support 3, so long as it is electroconductive, and the electroconductive support material includes, for example, metals such as aluminum, stainless steel, etc. and metals, plastics, paper, etc. provided with an electroconductive layer. The electroconductive support 3 can be in a cylindrical shape, a film shape, etc.

The present electrophotographic photosensitive member can be applied not only to printers such as laser beam printers, LED printers, CRT printers, etc., but also widely to the ordinary electrophotographic copying machines and other electrophotographic application fields.

Figure 22:
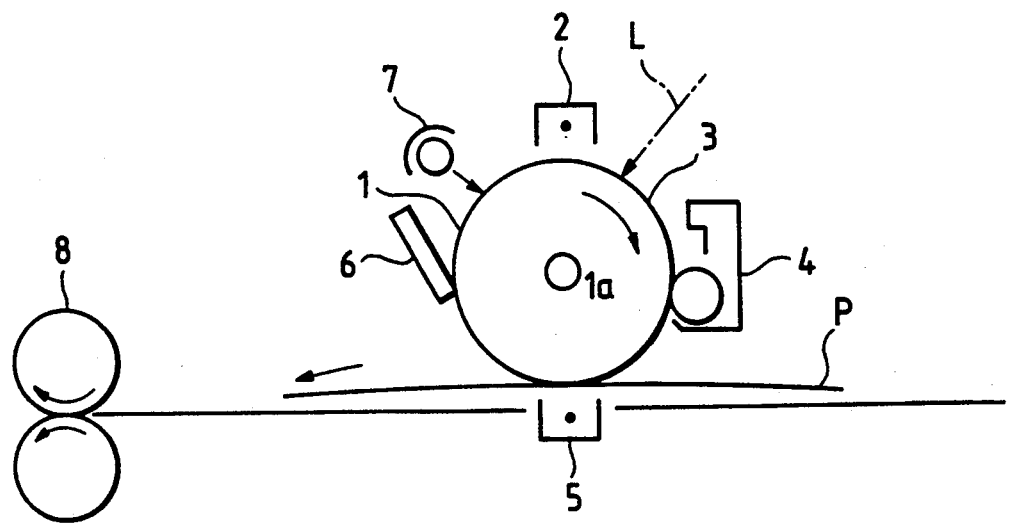
FIG. 22 shows the structure of an electrophotographic apparatus using the present electrophotographic photosensitive member.

In FIG. 22, a schematic structure of an ordinary transfer-type, electrophotographic apparatus using the present electrophotographic photosensitive member is shown, where numeral 1 is a drum type, photosensitive member as an image carrier, which is rotatable around a shaft 1a as a center in the arrow direction at a predetermined circumferential speed. The circumferential surface of the photosensitive member 1 is uniformly charged to a predetermined positive or negative potential by a charging means 2 during the rotation and then subjected to a light image exposure L, such as slit exposure, laser beam scanning exposure, etc., in a light exposure section 3 by an image exposure means (not shown in the drawing), whereby electrostatic latent images corresponding to image exposures are successively formed on the circumferential surface of the photosensitive member 1.

Then, the electrostatic latent images are subjected to a toner development by a developing means 4, and the toner-developed images are successively transferred by a transfer means 5 onto the surface of a transfer material P supplied from a supply means (not shown in the drawing) to the space between the pbotosensitive member 1 and the transfer means 5 and wound up synchronously with the rotation of the photosensitive member 1.

The image-transferred transfer material P is separated from the circumferential surface of the photosensitive member 1 and led to an image-fixing means 8 and image-fixed and printed out to the outside of the apparatus as copies.

After the image transfer, the circumferential surface of the photosensitive member 1 is removed of the remaining toners by a cleaning means 6 to clean the circumferential surface and further discharged by a preexposure means 7 and used for repeated image formation.

As the uniform charging means 2 for the photosensitive member 1, a corona charging means is usually used. As the transfer means 5 a corona transfer means is usually used. The electrophotographic apparatus may be composed of apparatus units each comprising integral combinations of some of constituent members such as the photosensitive member, the developing means, the cleaning means, etc. and the apparatus units may be detachable from the apparatus proper. For example, at least one of the charging means, the developing means and the cleaning means may be integrally supported together with the photosensitive member to form an apparatus unit and make the unit detachable from the apparatus proper as a single unit. That is, the apparatus unit may be made detachable by a guide means such as rails, etc. on the apparatus proper. The apparatus unit may be combined with the charging means and/or the developing means rather than the apparatus proper.

In case of using the electrophotographic apparatus as a copying machine or a printer, the light image exposure L can be carried out by a reflected light or transmission light from a manuscript, or by reading and signalizing a manuscript and scanning a laser beam, driving on LED array or a liquid crystal shutter array by the signals.

Figure 23:
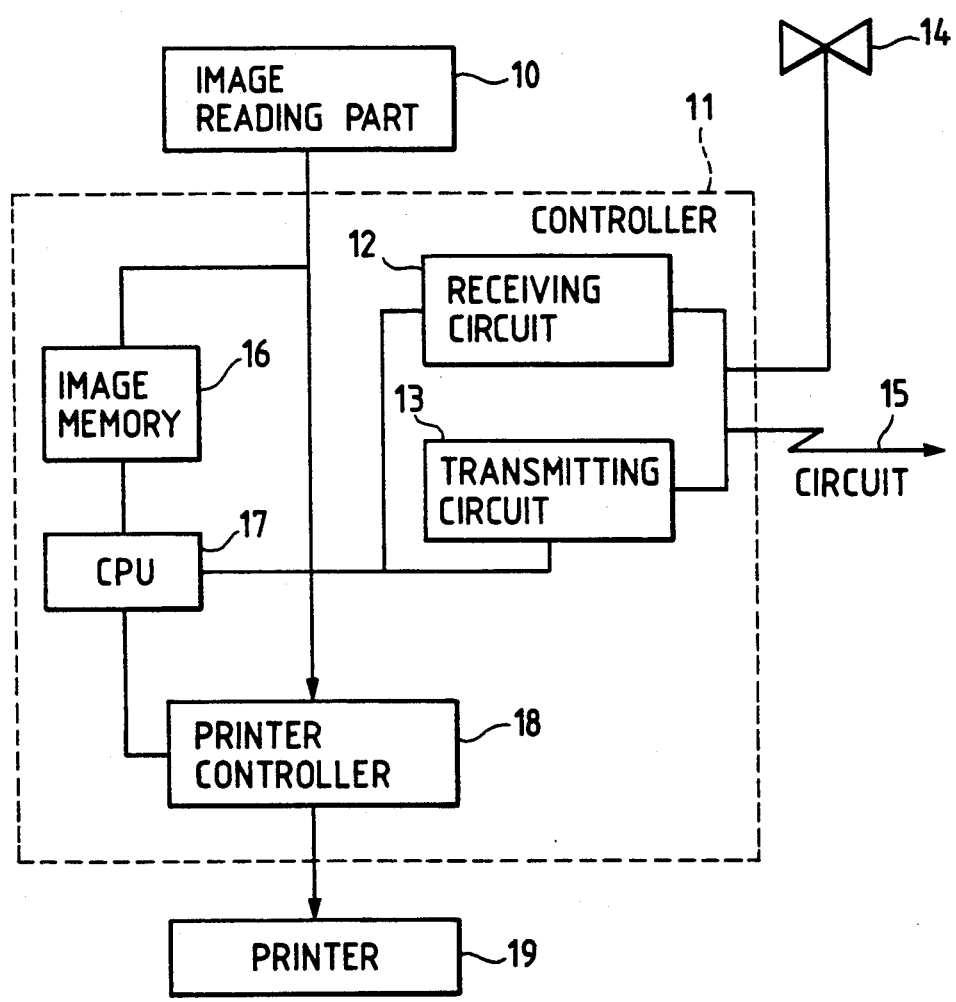
FIG. 23 is a block diagram of a facsimile using the electrophotographic apparatus based on the present electrophotographic photosensitive member as a printer.

In case of using the present electrophotographic photosensitive member as a facsimile printer, the light image exposure L serves as an exposure for printing received data. FIG. 23 is a block diagram showing one example of this case.

Controller 11 controls an image reading part 10 and a printer 19. The entirety of the controller 11 is conrolled by CPU 17. The read data from the image reading part 10 is transmitted to a remote station through a transmitting circuit 13. Data received from the remote station is transmitted to the printer through a receiving circuit 12. Predetermined image data are memorized in an image memory 16. A printer controller 18 controls the printer 19. Numeral 14 is a telephone.

Image received from a circuit 15 (image information from a remote terminal connected through the circuit) is demodulated in the receiving circuit 12, and then CPU 17 conducts a decoding treatment of the image information and decoded image are successively memorized in the image memory 16. Once at least one page of images is memorized in the image memory 16, image recording of the page is carried out. CPU 17 reads out one page of image information from the memory 16 and sends one page of decoded image information to the printer controller 18. On receiving one page of image information from CPU 17, the printer controller 18 controls the printer 19 to conduct the one page of image information recording. CPU 17 receives image information on the next page during the recording by the printer 19.

Receiving and recording of image information are carried out in the foregoing manner.

X-ray diffraction determination of the present oxytitanium phthalocyanines was carried out with characteristic X-ray of CuK$_\alpha$ under the following conditions:

Diffraction apparatus: X-ray diffraction apparatus, RAD-A system, made by Rigalsu Denki, K. K., Japan
X-ray tube: Cu
Tube voltage: 50 kV
Tube current: 40 mV
Scanning method: 2θ/θ scan
Scanning speed: 2 deg./min.
Sampling distance: 0.020 deg.
Start angle (2θ): 3 deg.
Stop angle (2θ): 40 deg.
Divergent slit: 0.5 deg.
Scattering slit: 0.5 deg.
Receiving slit: 0.5 mm Curved monochrometer was used.

Production Examples of the present low crystalline oxytitanium phthlocyanines will be given below:

PRODUCTION EXAMPLE 1

7.5 g of o-phthalodinitride and 4.Cg of titanium tetrachloride were stirred in 150 g of α-chloronaphthalene with heating at 200° C. for 3 hours, and then the mixture was cooled to 50° C. and the precipitated crystal were recovered therefrom by filtration, whereby a paste of dichlorotitanium phthalocyanine was obtained. Then, the paste was washed with 200 ml of N,N-dimethylformamide heated to 100 ° C. with stirring, then washed twice with 200 ml of methanol at 60° C. and recovered by filtration. Furthermore, the thus obtained paste was stirred in 100 ml of deionized water at 80 ° C. for one hour and recovered by filtration. In this manner, blue oxytitanium phthalocyanine compound was synthesized. Yield: 6.4 g. The elemental analysis of the compound was as follows:

Elemental analysis ($C_{32}H_{16}N_8TiO$):

|  | C | H | N | Cl |
|---|---|---|---|---|
| Calculated (%) | 66.68 | 2.80 | 19.44 | 0.00 |
| Found (%) | 66.50 | 2.99 | 19.42 | 0.48 |

Figure 8:
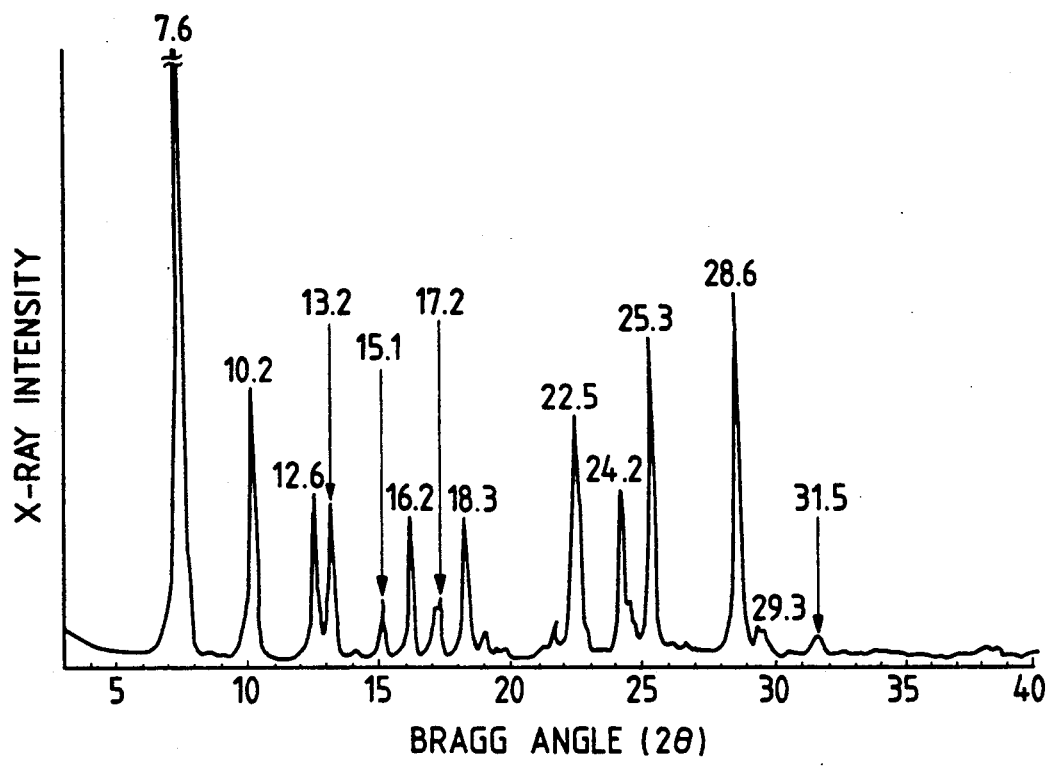
FIG. 8 is an X-ray diffraction diagram of B-type crystal of oxytitanium phthalocyanine.

The oxytitanium phthalocyanine compound was converted to oxytitanium phthalocyanine compound B-type crystals according to Japanese Patent Application Kokai (Laid-open) No. 61-239428 (U.S. Pat. No. 4,728,592) (the crystals are referred to as α-type in the Japanese Patent Application Kokai). X-ray diffraction diagram of the oxytitanium phthalocyanine B-type crystals is shown in FIG. 8.

Figure 9:
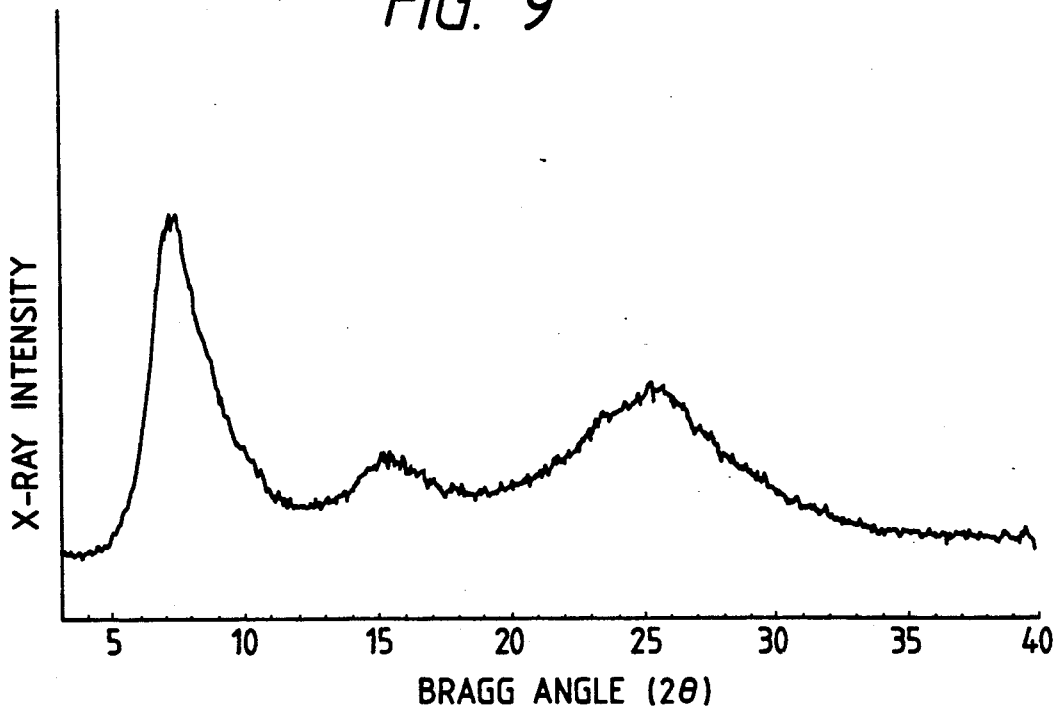
FIG. 9 is an X-ray diffraction diagram of amorphous oxytitanium phthalocyanine.

Then, 5.0 g of the oxytitanium phthalocyanine B-type crystals and 40 ml of glass beads, 1 mm in diameter, were placed in a sampling bottle having a capacity of 140 ml and subjected to pulverization treatment in a paint shaker for 24 hours. After the pulverization treatment, deionized water was added thereto and solid matters were recovered therefrom by filtration. The oxytitanium phthalocyanine thus obtained was completely amorphous as shown in FIG. 9.

Figure 10:
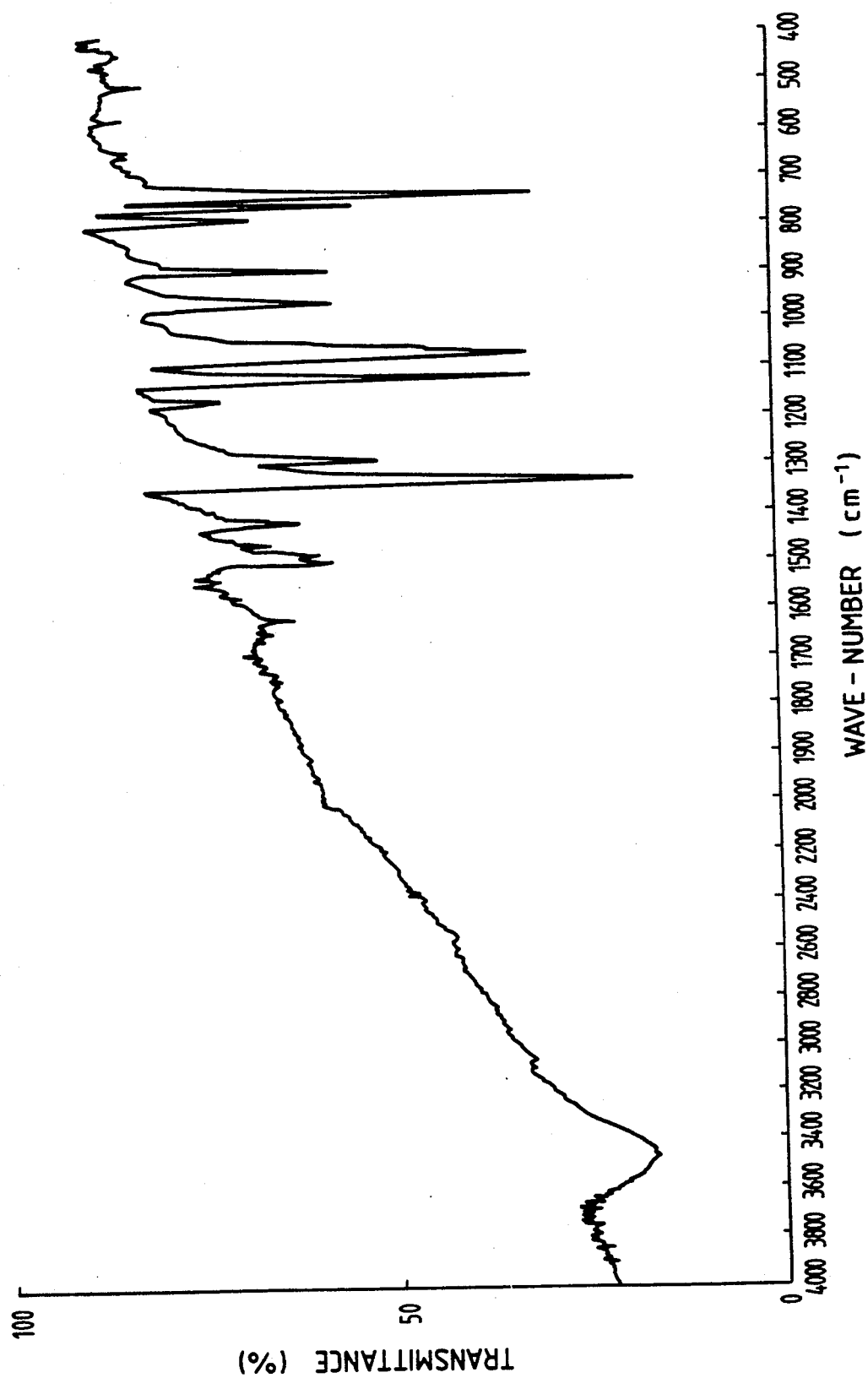
FIG. 10 is an infrared absorption spectrum diagram of low crystalline oxytitanium phthalocyanine according to the present invention (KBr method).
Figure 11:
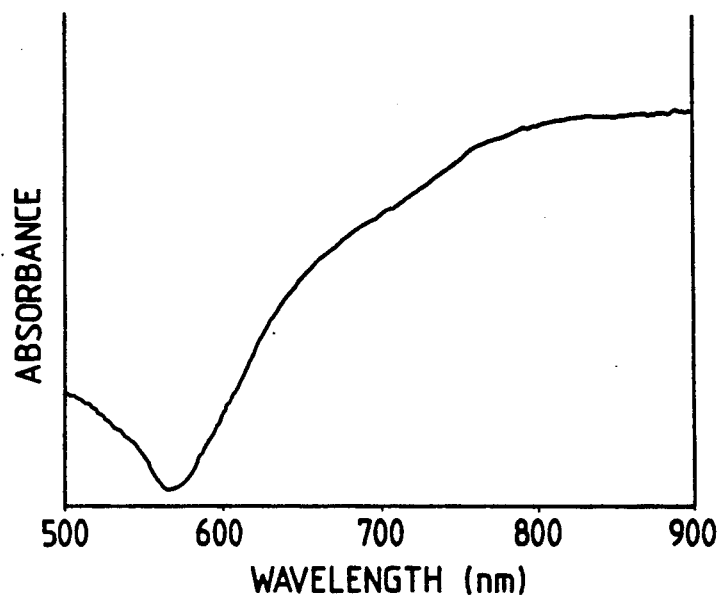
FIG. 11 is a UV absorption spectrum diagram of low crystalline oxytitanium phthalocyanine according to the present invention.

Then, 4.0 g of the amorphous oxytitanium phthalocyanine was admixed with 100 ml of methanol and stirred by a magnetic stirrer at room temperature (22° C.) for 3 hours, followed by filtration and drying at room temperature under reduced pressure. Thus, the present low crystalline oxytitanium phthalocyanine was obtained. Yield: 3.9 g. X-ray diffraction diagram of the thus obtained low crystalline oxytitanium phthalocyanine is shown in FIG. 1. KBr pellets were also prepared and its infrared absorption spectra were measured. The results are shown in FIG. 10. The results of UV absorption spectrum measurement in a methanol dispersion are also shown in FIG. 11. Production Example 2

Figure 12:
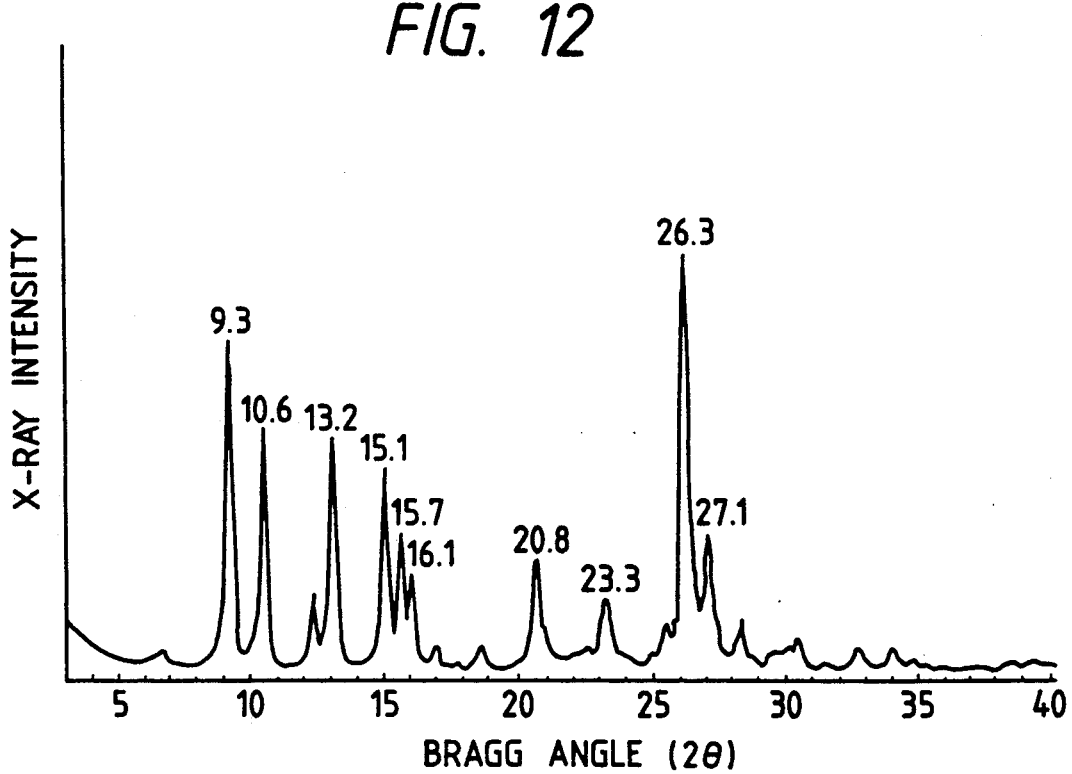
FIG. 12 is an X-ray diffraction diagram of A-type crystal of oxytitanium phthalocyanine.

Blue oxytitanium phthalocyanine synthesized in the same manner as in Production Example 1 was converted to oxytitanium phthalocyanine A-type crystals according to Production Example disclosed in Japanese Patent Application Kokai (laid-open) No. 62-67094 (U.S. Pat. No. 4,664,997). X-ray diffraction diagram of the thus obtained oxytitanium phthalocyanine A-type crystals is shown in FIG. 12.

5.0 g of the oxytitanium phthalocyanine A-type crystals thus obtained and 40 ml of stainless steel beads, 2 mm in diameter, were placed in a glass bottle and subjected to a pulverization on the table ball mill frame for 48 hours. After the treatment, deionized water was added thereto, and solid matters were recovered by filtration. Amorphous oxytitanium phthalocyanine showing the same X-ray diffraction diagram as in FIG. 9 was obtained. Then, 4.0 g of the amorphous oxytitanium phthalocyanine was admixed with 100 ml of methanol, stirred by a magnetic stirrer at room temperature (22° C.) for 5 hours. and then dried at room temperature under reduced pressure, whereby the present low crystalline oxytitanium phthalocyanine was obtained. Yield: 3.6 g. X-ray diffraction diagram of the low crystalline oxytitanium phthalocyanine is shown in FIG. 2.

APPLIED PRODUCTION EXAMPLE 1

0.5 g of low crystalline oxytitanium phthalocyanine obtained in Production Example 1, 5.0 g of methylcarbitol, and 8 ml of glass beads, 1 mm in diameter, were placed in a glass bottle and dispersed in a paint shaker at room temperature for 20 hours.

Figure 13:
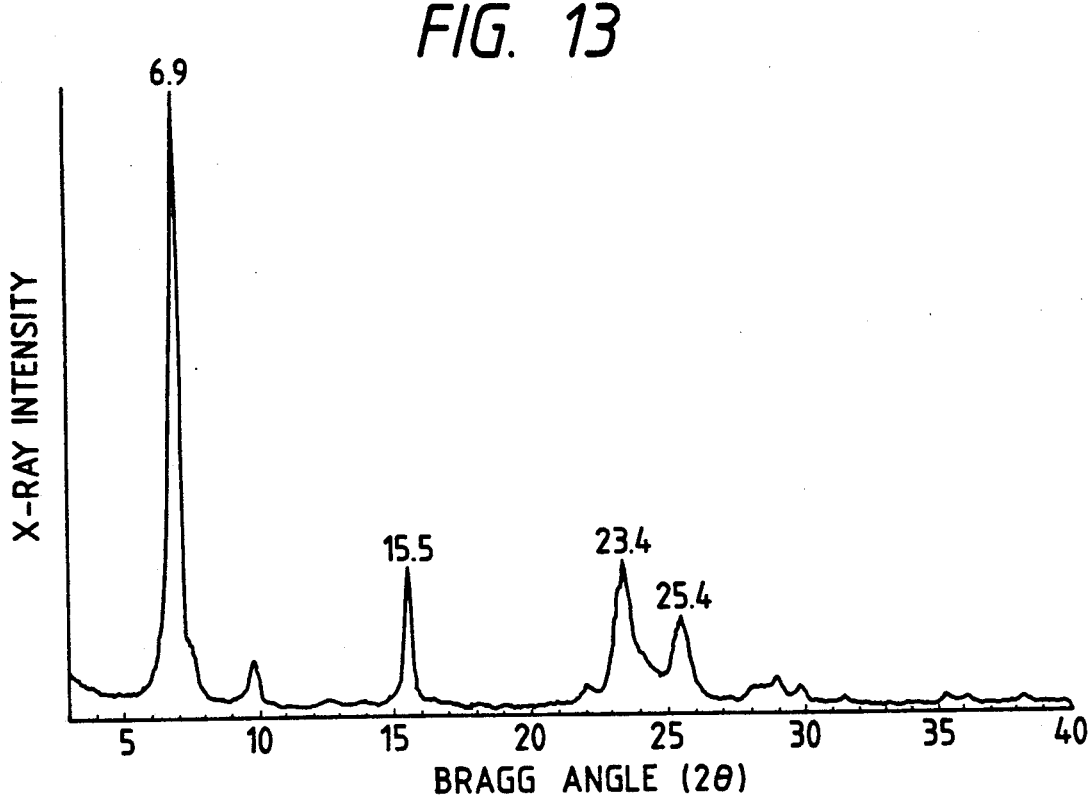
FIG. 13 is an X-ray diffraction diagram of C-type crystal of oxytitanium phthalocyanine obtained in Applied production Example.

After the glass beads were separated therefrom, solid matters were recovered therefrom by filtration and washed with methanol and dried at room temperature under reduced pressure. X-ray diffraction diagram of the thus obtained oxytitanium phthalocyanine is shown in FIG. 13.

The compound was found to be oxytitanium phthalocyanine C-type crystals disclosed in Japanese Patent Application Kokai (laid-open) No. 63-365 and No. 63-366.

APPLIED PRODUCTION EXAMPLE 2

0.5 g of low crystalline oxytitanium phthalocyanine obtained in Production Example 1, 5.0 g of ethylene glycol and 8 ml of glass beads, 1 mm in diameter, were placed in a glass bottle and dispersed by a paint shaker at room temperature for 20 hours.

Then, after the glass beads were separated therefrom, solid matters were recovered by filtration and washed With methanol and dried at room temperature under reduced pressure. X-ray diffraction diagram of the thus obtained oxytitanium phthalocyanine is shown in FIG. 3. The compound was found to be oxytitanium phthalocyanine of novel crystal form having strong peaks at 7.4°, 10.9° and 17.9°.

APPLIED PRODUCTION EXAMPLE 3

0.5 g of low crystalline oxytitanium phthalocyanine obtained in Production Example 1, 5.0 g of propylene glycol and 8 ml of glass beads, 1 mm in diameter, were placed in a glass bottle and dispersed by a paint shaker at room temperature for 20 hours.

Then, after the glass beads were separated therefrom, solid matters were recovered by filtration, washed with methanol and dried at room temperature under reduced temperature. X-ray diffraction diagram of the thus obtained oxytitanium phthalocyanine is shown in FIG. 4.

The compound was oxytitanium phthalocyanine of novel crystal form having strong peaks at 7.6°, 9.7°, 12.7°, 16.2° and 26.4°.

APPLIED PRODUCTION EXAMPLE 4

0.5 g of low crystalline oxytitanium phthalocyanine obtained in Production Example 1, 5.0 g of an aqueous 50% mannitol solution and 8 ml of glass beads, 1 mm in diameter, Were placed in a glass bottle and dispersed by a paint shaker at room temperature for 60 hours.

Then, after the glass beads were separated therefrom, solid matters were recovered by filtration, washed by methanol and dried at room temperature under reduced pressure. X-ray diffraction diagram of the thus obtained oxytitanium phthalocyanine is shown in FIG. 5.

The compound was oxytitanium phthalocyanine of novel crystal form having strong peaks at 8.5°, 10.2° and 10.5°.

APPLIED PRODUCTION EXAMPLE 5

1.0 g of low crystalline oxytitanium phthalocyanine obtained in Production Example 1 was charged into a 100 ml flask provided with a thermometer and a stirrer, and 60 ml of propylene glycol was added thereto. The mixture was heated to 80° C., followed by stirring at 80° C. for 20 hours. Then, the resulting suspension was cooled down to room temperature and subjected to filtration. The resulting cakes were washed with methanol, and the solvent was removed therefrom to dry the cakes. It was found from X-ray diffraction pattern that the thus obtained oxytitanium phthalocyanine had the same crystal form as shown in FIG. 4

APPLIED PRODUCTION EXAMPLES 6 TO 11

The same treatment as in Applied Production Examples 1 to 3 was carried out except that the solvents shown in Table-1 were used in place of the solvent used in Applied Production Example 1.

TABLE 1

| Applied Production Example | Solvent | Crystal form after the treatment |
| --- | --- | --- |
| 6 | n-butyl cellosolve | C-type |
| 7 | Ethylene glycol Monoisobutyl ether | C-type |
| 8 | Diacetone alcohol | C-type |
| 9 | Methyl cellosolve | Crystal form of FIG. 3 |
| 10 | 1,3-butanediol | Crystal form of FIG. 4 |
| 11 | glycerine | Crystal form of FIG. 4 |

COMPARATIVE PRODUCTION EXAMPLES 1 to 6

The same treatment as in Applied Production Examples 1 to 3 was carried out with the same solvent used in Applied Production 1 to 3 for comparisons except that the starting material was replaced with A-type crystals or B-type crystals as shown in Table 2. The crystal forms thus obtained are shown in Table 2.

TABLE 2

| Comp. Production Example | Starting material | Solvent | Crystal form after the treatment |
| --- | --- | --- | --- |
| 1 | A-type | Methylcarbitol | A-type |
| 2 | B-type | " | B-type |
| 3 | A-type | Ethylene glycol | A-type |
| 4 | B-type | " | B-type |
| 5 | A-type | Propylene glycol | A-type |
| 6 | B-type | " | B-type |

Examples will be shown below, where oxytitanium phthalocyanines of novel crystal forms obtained from the present low crystalline oxytitanium phthalocyanines were applied to electrophotographic photosensitive members. In Examples, parts are by weight.

EXAMPLE 1

50 parts of titanium oxide powder, coated with tin oxide containing 10% of antimony oxide, 25 parts of resol-type phenol resin, 20 parts of methyl cellosolve, 5 parts of methanol and 0.002 parts of silicone oil (polydimethylsiloxanepolyoxyalkylene copolymer; average molecular weight: 3,000) were dispersed in a sand mill using glass beads, 1 mm in diameter, for 2 hours to prepare a paint for the electroconductive layer.

The thus prepared paint was applied to an aluminum cylinder (30 mm in diameter×260 mm) by dipping and dried at 140 ° C. for 30 minutes to form an electroconductive layer having a thickness of 20 μm.

Applied to the electroconductive layer was a solution prepared by dissolving 5 parts of 6-66-610-12 quarternary polyamide copolymer resin into a solvent mixture consisting of 70 parts of methanol and 25 parts of butanol by dipping, followed by drying, so that an underlayer having a thickness of 1 μm was formed on the electroconductive layer.

Then, 4 parts of oxytitanium phthalocyanine of the crystal form obtained in Applied Production Example 2 and 2 parts of polyvinyl butyral resin were added to 100 parts of cyclohexanone and the mixture was dispersed in a sand mill using glass beads, 1 mm in diameter, and then admixed with 100 parts of methylethylketone for to make a dilution, and then the mixture Was applied to the underlayer, followed by drying at 80° C. for 10 minutes to form a charge generation layer, 0.15 μm in thickness.

Then, a solution containing 10 parts of a charge transport material represented by the following structural formula:

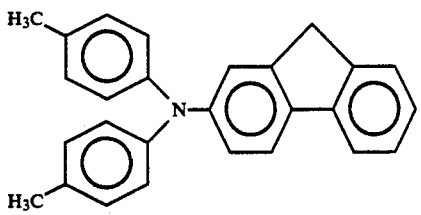

and 10 parts of bisphonol Z-type polycarbonate resin in 60 parts of monochlorobenzene was prepared and applied to the charge generation layer by dipping, followed by drying at 110° C. for one hour to form a charge transport layer, 20 μm in thickness. An electrophotographic photosensitive member was prepared thereby.

EXAMPLE 2

An electrophotographic photosensitive member was prepared in the same manner as in Example 1 except that oxytitanium phthalocyanine of the crystal form obtained in Applied Production Example 4 was used.

COMPARATIVE EXAMPLE 1

An electrophotographic photosensitive member was prepared in the same manner as in Example 1 except that oxytitanium phthalocyanine B-type crystals having an X-ray diffraction pattern as shown in FIG. 8 was used.

COMPARATIVE EXAMPLE 2

An electrophotographic photosensitive member was prepared in the same manner as in Example 1 except that an oxytitanium phthaoyanine A-type crystal having an X-ray diffraction pattern as shown in FIG. 12 was used.

COMPARATIVE EXAMPLE 3

Figure 14:
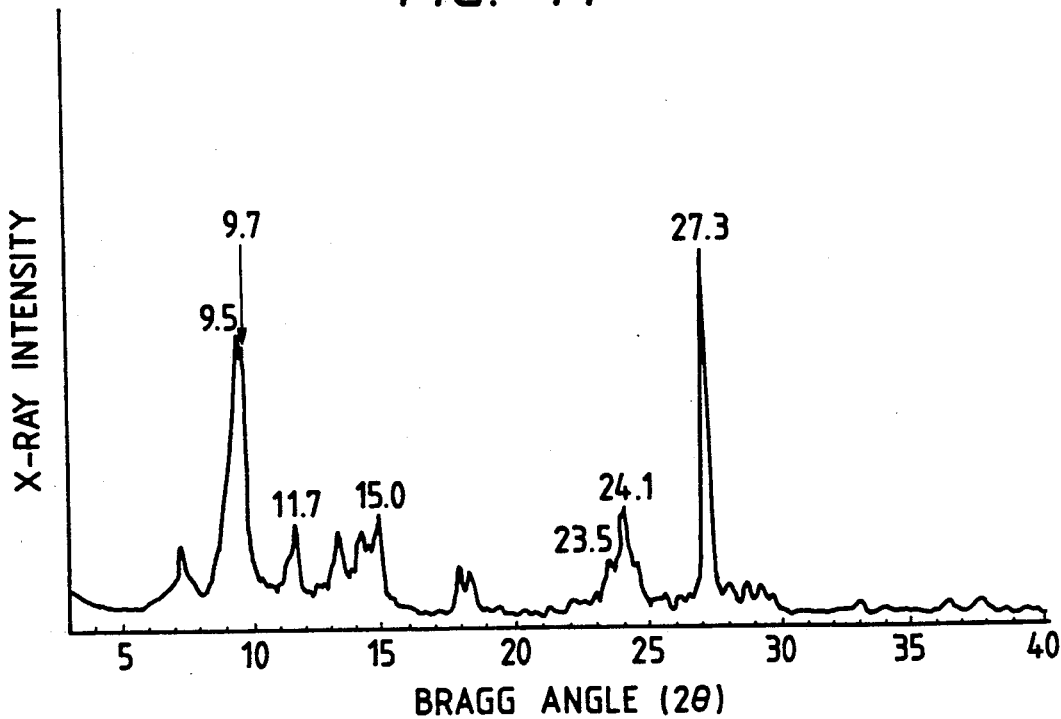
FIG. 14 is an X-ray diffraction diagram of oxytitanium phthalocyanine crystal used in Comparative Example 3.

Oxytitanium phthalocyanine crystals having the same. crystal form as that of Japanese Patent Application Kokai (laid-open) No. 64-17066 were prepared according to Production Examples disclosed in Japanese Patent Application Kokai (laid-open) No. 64-17066. Its X-ray diffraction diagram is shown in FIG. 14. An electrophotographic photosensitive member was prepared in the same manner as in Example 1 except that the thus obtained crystals were used.

The electrophotographic photosensitive members of Examples 1 and 2 and Comparative Examples 1, 2 and 3 were used in a laser beam printer (LBP-SX: Trademark Inc.; manufactured by Canon K. K.) and the changing was so set that the dark portion potential was −700(V), and the light quantity necessary to lower the potential of −700(V), to −150(V) by irradiation of a laser beam with a wavelength of 680 nm was measured as a sensitivity.

The results are shown in Table 3.

TABLE 3

| Sample | Sensitivity (μJ/cm$^2$) |
|---|---|
| Example 1 | 0.40 |
| Example 2 | 0.37 |
| Comp. Ex. 1 | 0.82 |
| Comp. Ex. 2 | 0.86 |
| Comp. Ex. 3 | 0.52 |

Then, these five photosensitive members were subjected to a continuous durability test of 4,000 sheets by setting the dark portion potential to −700(V) and the bright portion potential to −150(V) to measure the dark portion potential and the bright portion potential after the durability test by sheet and evaluate the transferred images.

Figure 15:
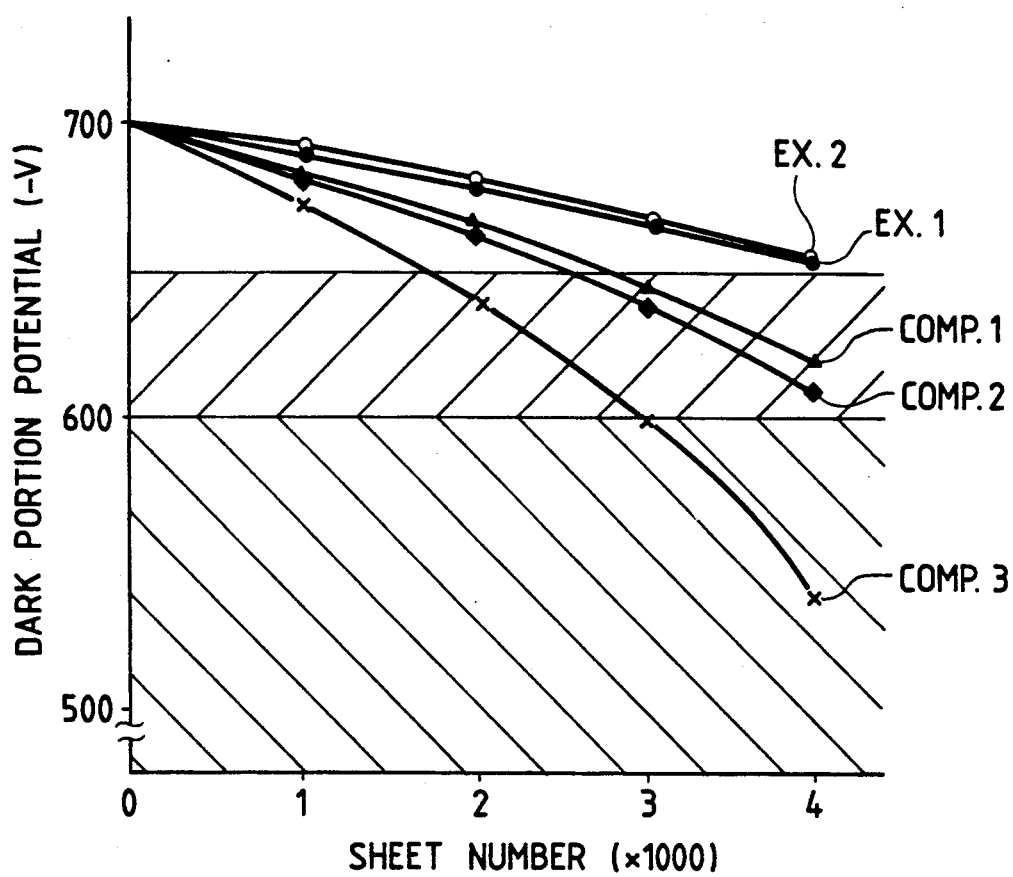
FIGS. 15 and 19 are diagrams showing the state of fluctuations in the dark portion potential in (sheet-getting through) durability tests of electrophotographic photosensitive members obtained in Examples.
Figure 16:
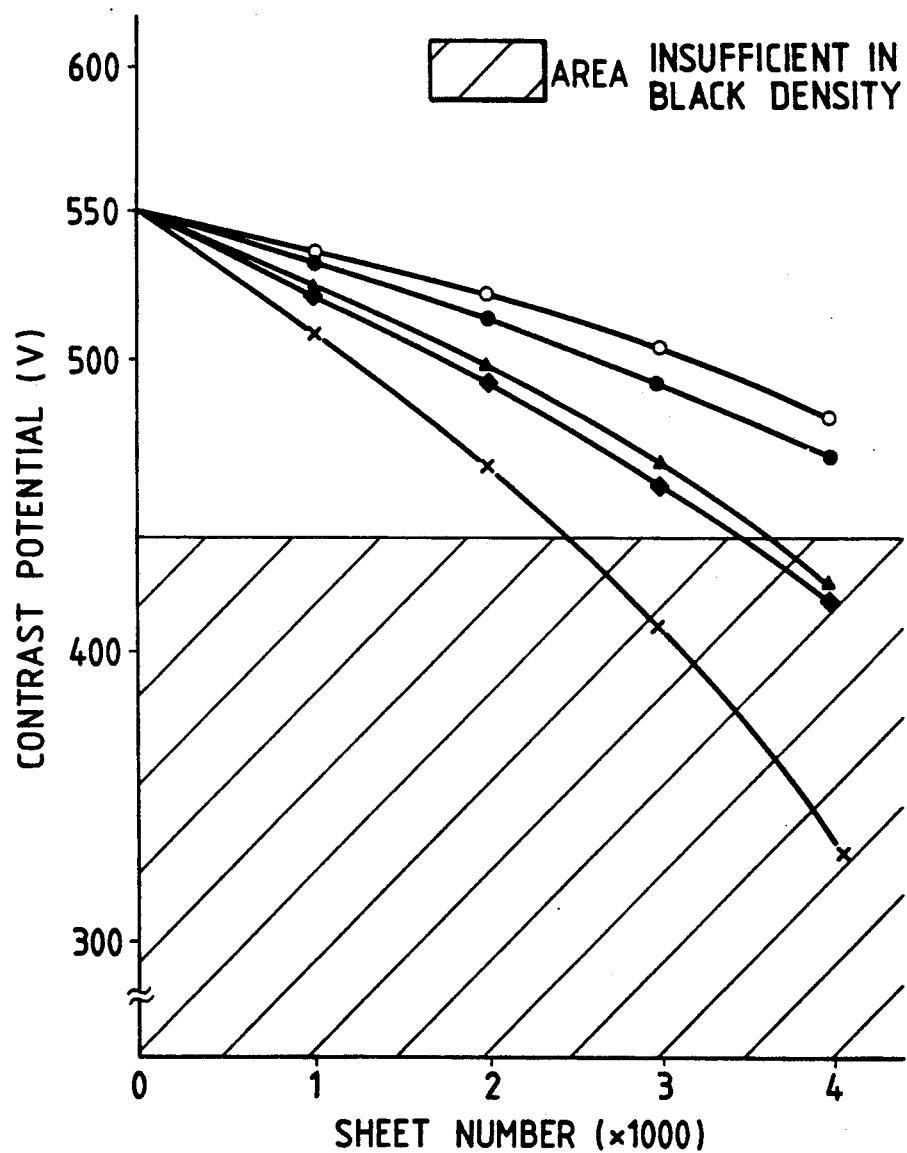
FIGS. 16 and 20 are diagrams showing the state of fluctuations in the contrast potential in (sheet-getting through) durability tests of electrophotographic photosensitive members obtained in Examples.

The state of fluctuation in the dark portion potential in the durability test by sheet is shown in FIG. 15 and the state of fluctuation in the contrast potential between the dark portion potential and the bright portion potential is shown in FIG. 16.

As is obvious from the results shown in FIG. 15 and 16, as good images as those at the initial period were obtained in Examples 1 and 2 after the durability test by sheet, but fogging in white ground occurred in Comparative Examples 1, 2 and 3, particularly remarkable in Comparative Example 3.

To remove the fogging in Comparative Examples 1, 2 and 3, control was made by a density control lever, but the black density was found insufficient.

Then, each of the same photosensitive members as in Examples 1 and 2 and Comparative Examples 1, 2 and 3 was used in an irradiation test, where a part of the respective photosensitive members was exposed to white light of 1,500 luxes for 30 minutes, and then the photosensitive members were set on the above-mentioned laser beam printer and a difference in the dark portion potential of the white light-irradiated part from the white light-unirradiated part by setting the dark portion potential of the unirradiated part to −700(V) was measured. The results are shown in Table 4.

TABLE 4

|  | Before irradiation (V) | After irradiation (V) | Difference (V) |
|---|---|---|---|
| Example 1 | −700 | −665 | 35 |
| Example 2 | −700 | −670 | 30 |
| Comp. Ex. 1 | −700 | −620 | 80 |
| Comp. Ex. 2 | −700 | −625 | 75 |
| Comp. Ex. 3 | −700 | −595 | 105 |

Figure 17:
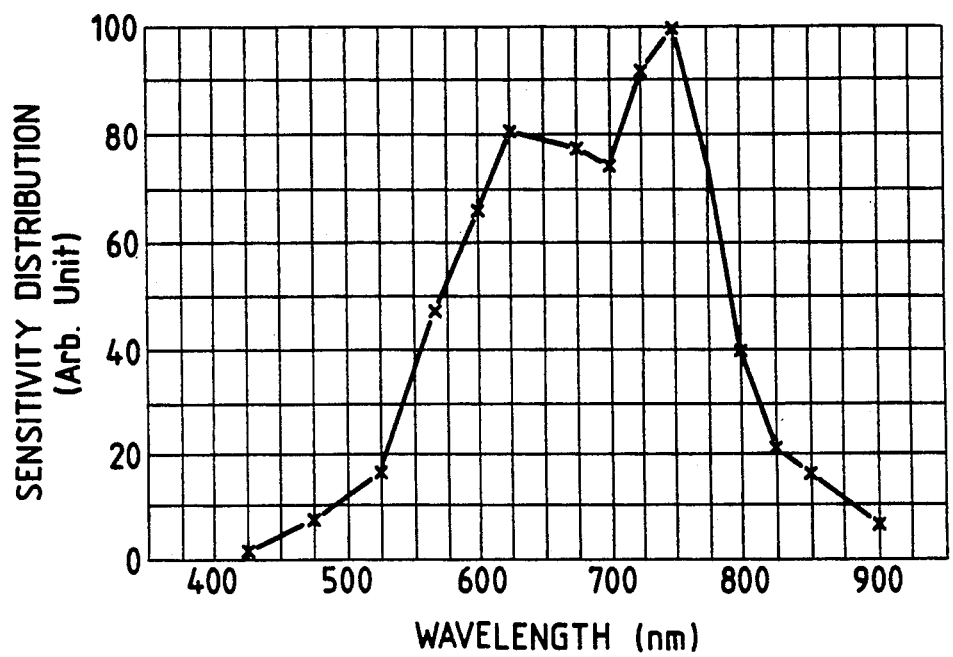
FIGS. 17, 18 and 21 are diagrams showing spectroscopic sensitivity distribution of electrophotographic photosensitive members of Examples 1, 2 and 11, respectively.
Figure 18:
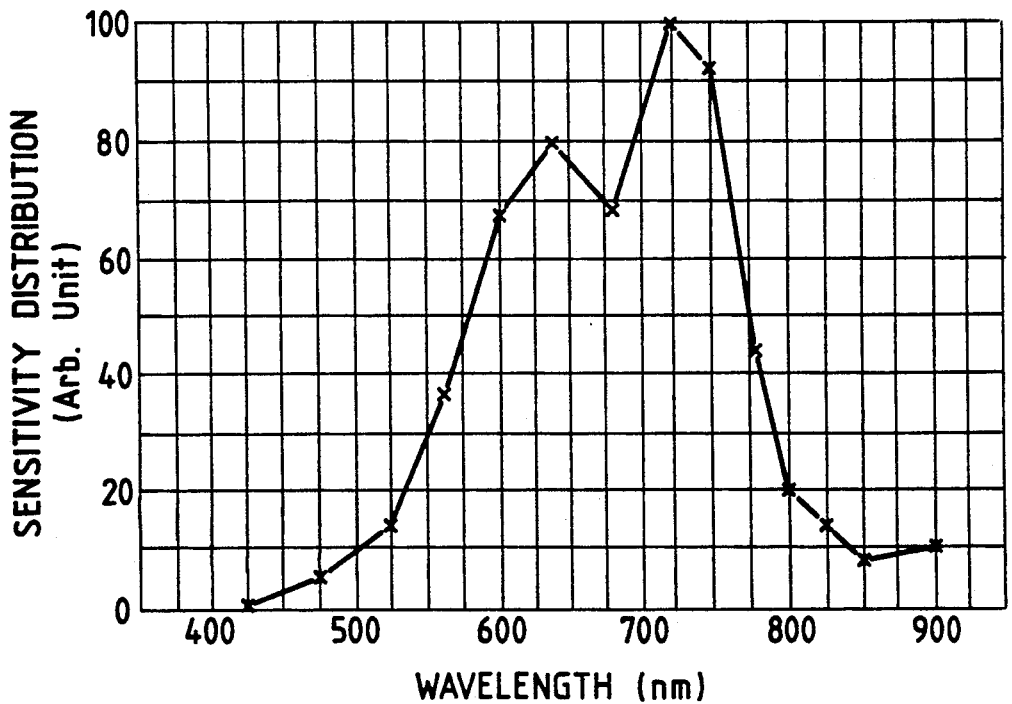

Spectroscopic sensitivity distribution of the electrophotographic photosensitive members of Example 1 and Example 2, when the maximum spectroscopic sensitivity is made 100, are shown in FIG. 17 and FIG. 18, respectively.

Thus, the electrophotographic photosensitive members of Examples 1 and 2 show stable, high sensitivity characteristics in the long-wavelength region of about 600 nm to about 720 nm.

EXAMPLES 3 AND 4

Electrophotographic photosensitive members were prepared in the same manner as in Examples 1 and 2 except that bisphenol Z-type polycarbonate resin was used as a charge generation layer in Examples 1 and 2.

EXAMPLES 5 AND 6

Electrophotographic photosensitive members were prepared in the same manner as in Examples 1 and 2 except that a compound represented by the following structural formula:

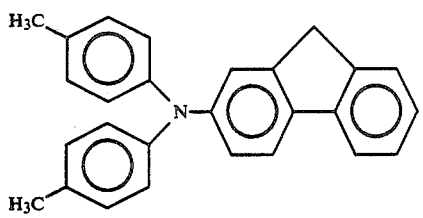

was used as a charge transport material.

EXAMPLES 7 AND 8

Electrophotographic photosensitive members were prepared in the same manner as in Examples 1 and 2 except that a compound represented by the following structural formula:

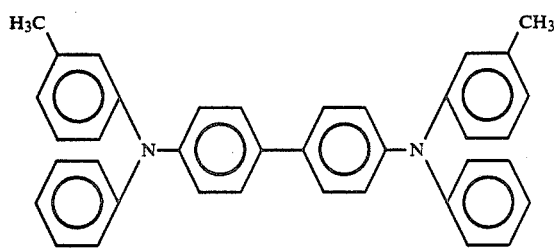

was used as a charge transport material.

In Examples 3 to 8, the light quantity required for changing the surface potential from $-700(V)$ to $-150(V)$ was measured as a sensitivity by the use of a laser beam printer in the same manner as in Example 1. The results are shown in Table 5.

TABLE 5

| Sample | Sensitivity ($\mu J/cm^2$) |
|---|---|
| Example 3 | 0.40 |
| Example 4 | 0.35 |
| Example 5 | 0.41 |
| Example 6 | 0.36 |
| Example 7 | 0.45 |
| Example 8 | 0.39 |

EXAMPLE 9

A similar underlayer to that of Example 1 was formed on an aluminium sheet substrate having a thickness of 50 μm by bar coating, and a charge transport layer having a thickness of 20 μm similar to that of Example 1 was formed thereon. Then, 5 parts of bisphenol Z-type polycarbonate was dissolved in 68 parts of cyclohexane, and 3 parts of oxytitanium phthalocyanine of the crystal form obtained in Applied Production Example 2 was added thereto. The mixture was dispersed in a sandmill for one hour, and then 5 parts of bisphenol Z-type polycarbonate and 10 parts of the same charge transport material as used in Example 1 were dissolved therein. Then, 40 parts of tetrahydrofuran and 40 parts of dichloromethane were added thereto for dilution to obtain a dispersion paint. The paint was applied to the charge transport layer by spray coating, followed by drying to form a charge generation layer having a thickness of 6 μm. Thus, an electrophotographic photosensitive member was prepared thereby.

EXAMPLE 10

An electrophotographic photosensitive member was prepared in the same manner as in Example 9 except that the oxytitanium phthalocyanine of the crystal form obtained in Applied Production Example 4 was used.

COMPARATIVE EXAMPLE 4

An electrophotographic photosensitive member was prepared in the same manner as in Example 9 except that oxytitanium phthalocyanine B-type crystal having the X-ray diffraction pattern as shown in FIG. 8 was used as a charge generation material.

COMPARATIVE EXAMPLE 5

An electrophotographic photosensitive member was prepared in the same manner as in Example 9 except that oxytitanium phthalocyanine A-type crystal having the X-ray diffraction pattern as shown in FIG. 12 was used as a charge generation material.

COMPARATIVE EXAMPLE 6

An electrophotographic photosensitive member was prepared in the same manner as in Example 9 except that oxytitanium phthalocyanin having the same crystal form as that of Japanese Patent Application Kokai (laid-open) No. 64-17066 having the X-ray diffraction pattern as shown in FIG. 14 was used as a charge generation material.

The electrophotograpbic photosensitive members thus obtained in Examples 9 and 10 and Comparative Example 4, 5 and 6 were evaluated by an electrostatic tester (EPA-8100; made by Kawaguchi Denki K. K.).

Evaluation was carried out by initially setting the surface potential to 700V by positive corona charging and measuring the light quantity where the surface potential was lowered to 200(V) by exposure to a laser beam of 680 nm as a sensitivity. The results are shown in Table 6.

TABLE 6

| Sample | Sensitivity ($\mu J/cm^2$) |
|---|---|
| Example 9 | 0.61 |
| Example 10 | 0.49 |
| Comp. Example 4 | 0.95 |
| Comp. Example 5 | 1.10 |
| Comp. Example 6 | 0.82 |

EXAMPLE 11

An electrophotograpbic photosensitive member was prepared in the same manner as in Example 1 except that oxytitanium phthalocyanine of the crystal form obtained in Applied Production Example 3 was used.

The electrophotographic photosensitive members of Example 11 and Comparative Examples 1, 2 and 3 were set on a laser beam printer (LBP-SX: Trademark; manufactured by Canon Inc.), and the charging was so set as to make the dark portion potential $-700(V)$. The necessary quantity for lowering the potential of $-700(V)$ to $-150(V)$ by exposure to a laser beam of 802 nm was measured as a sensitivity. The results are shown in Table 7.

TABLE 7

| Sample | Sensitivity ($\mu J/cm^2$) |
|---|---|
| Example 11 | 0.35 |
| Comp. Example 1 | 0.71 |
| Comp. Example 2 | 0.75 |

TABLE 7-continued

| Sample | Sensitivity (μJ/cm²) |
| --- | --- |
| Comp. Example 3 | 0.42 |

Then, these four photosensitive members were subjected to a continuous durability test of 4,000 sheets with setting the dark portion potential to −700 (V) and the bright portion potential to −150(V), and measurement of the dark portion potential and the bright portion potential and evaluation of images were carried out after the durability test by sheet.

Figure 19:
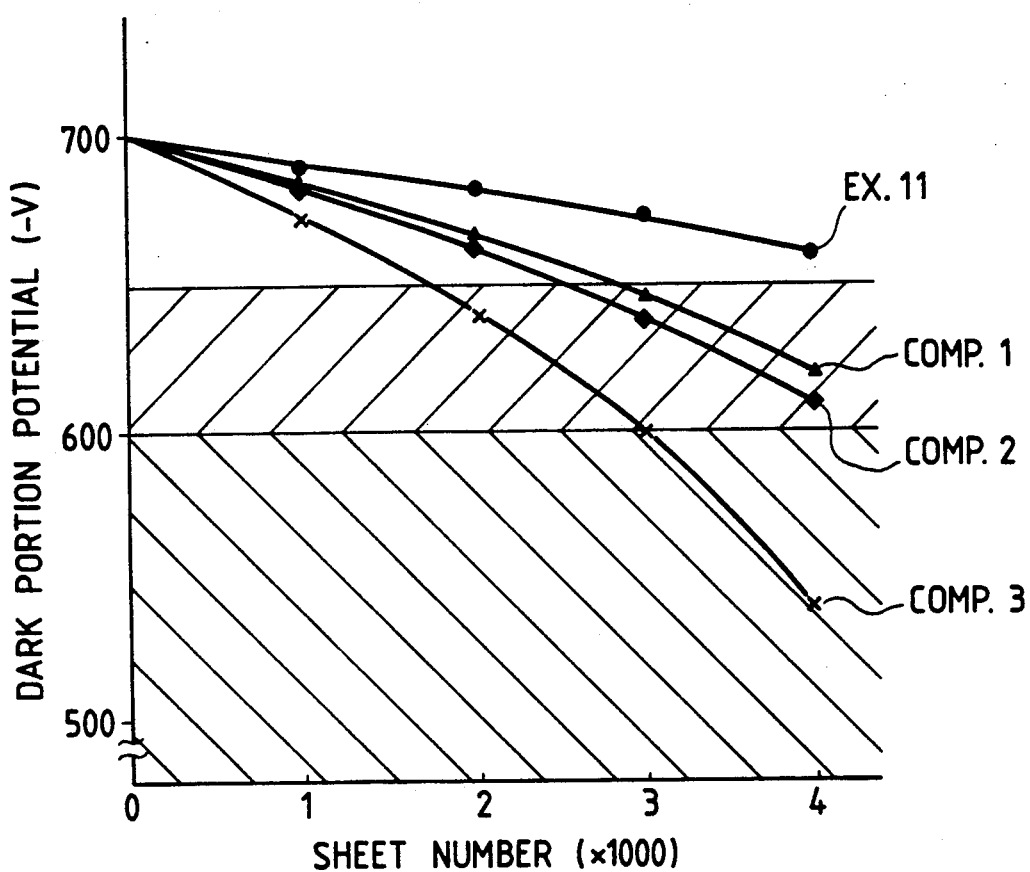
Figure 20:
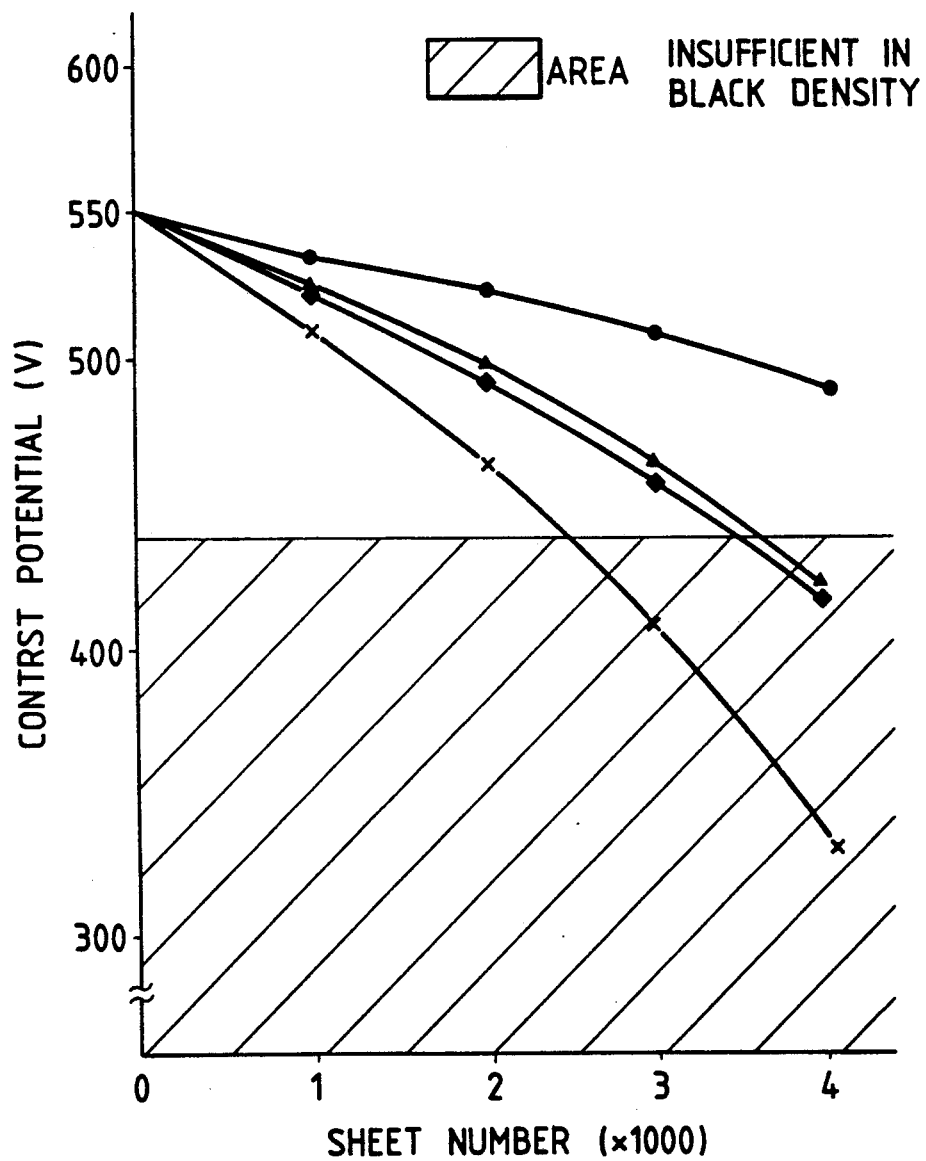

The state of fluctuation in the dark portion potential during the sheet durability test is shown in FIG. 19, and the state in the contrast potential between the dark portion potential and the bright portion potential is shown in FIG. 20.

As is obvious from FIG. 19 and 20, as good images as those at the initial period were obtained in Example 11 after the durability test, whereas fogging in white ground occurred in Comparative Examples 1, 2 and 3, particularly remarkable in Comparative Example 3.

To remove the fogging in Comparative Example 1, 2 and 3, control was made by a density control lever, but the black ground density was found insufficient.

Each one of the same photosensitive members as in Example 11 and Comparative Examples 1, 2 and 3 were used in an irradiation test, where a part of each of the photosensitive members was exposed to white light of 1,500 luxes for 30 minutes and a difference in the dark portion potential of the irradiated part from the white light-unirradiated part was measured with setting the dark portion potential of the unirradiated part to −700(V). The results are shown in Table 8.

TABLE 8

| | Before the irradiation (V) | After the irradiation (V) | Difference (V) |
| --- | --- | --- | --- |
| Example 11 | −700 | −680 | 20 |
| Comp. Ex. 1 | −700 | −620 | 80 |
| Comp. Ex. 2 | −700 | −625 | 75 |
| Comp. Ex. 3 | −700 | −595 | 105 |

Figure 21:
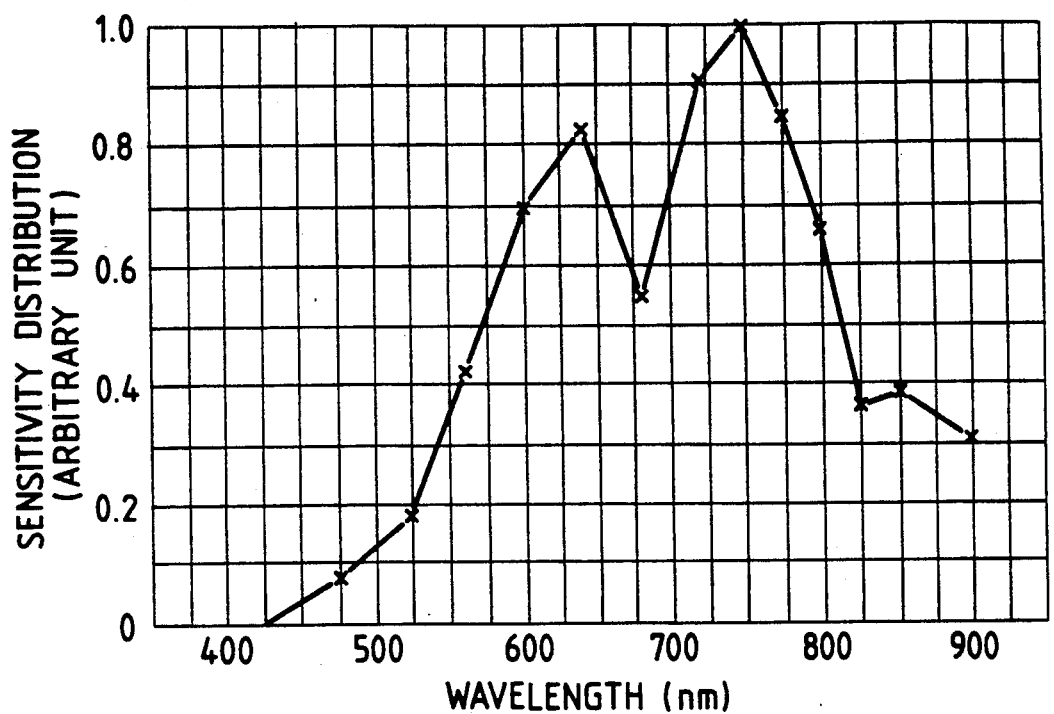

In FIG. 21, spectroscopic sensitivity distribution of the electrophotographic photosensitive member of Example 11 is shown, in which the maximum spectroscopic sensitivity is made 100.

Thus, the present electrophotographic photosensitive member shows stable, high-sensitivity characteristics in the long-wavelength region of about 770 to about 810 nm.

EXAMPLE 12

An electrophotographic photosensitive member was prepared in the same manner as in Example 11 except that bisphenol Z-type polycarbonate resin was used as a binder resin for the charge generation layer.

EXAMPLE 13

An electrophotographic photosensitive member was prepared in the same manner as in Example 11 except that a compound represented by the following structural formula:

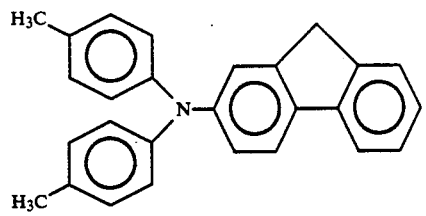

was used as a charge transport material.

EXAMPLE 14

An electrophotographic photosensitive member was prepared in the same manner as in Example 11 except that a compound represented by the following structural formula:

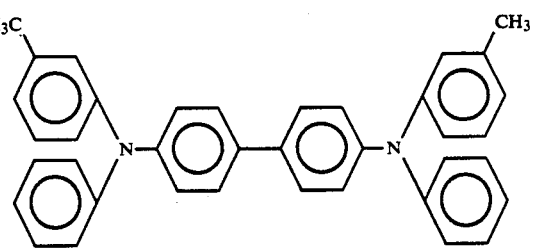

was used as a charge transport material.

The electrophotographic photosensitive members by Examples 12, 13 and 14 are subjected to measurement of the necessary light quantity for changing the surface potential from −700(V) to −150(V) in a laser beam printer as in Example 11 as a sensitivity. The results are shown in Table 9.

TABLE 9

| Sample | Sensitivity (μJ/cm²) |
| --- | --- |
| Example 12 | 0.41 |
| Example 13 | 0.39 |
| Example 14 | 0.42 |

EXAMPLE 15

An electrophotographic photosensitive member was prepared in the same manner as in Example 9 except that oxytitanium phthalocyanine of the crystal form obtained in Comparative Production Example 3 was used.

The thus obtained electrophotographic photosensitive members of Example 15 and Comparative Examples 4, 5 and 6 were evaluated by an electrostatic tester (EPA-8100, made by Kawaguchi Denki K. K.).

Evaluation was made by initially setting the surface potential to 700(V) by positive corona charging and then measuring a light quantity where the surface potential was lowered to 200(V) upon exposure to a monochromatic beam of 802 nm separated by a monochrometer as a sensitivity. The results are shown in Table 10.

TABLE 10

| Sample | Sensitivity (μJ/cm²) |
| --- | --- |
| Example 15 | 0.62 |
| Comp. Example 4 | 0.99 |
| Comp. Example 5 | 1.05 |

| Sample | Sensitivity ($\mu J/cm^2$) |
|---|---|
| Comp. Example 6 | 0.62 |

What is claimed is:

1. A low crystalline oxytitanium phthalocyanine having strong peaks at Bragg angles $2\theta \pm 0.2°$ of 7.2°, 14.2°, 24.0° and 27.2° in the X-ray diffraction CuKα.

2. A process for producing a crystalline oxytitanium phthalocyanine, which comprises treating low crystalline oxytitanium phthalocyanines having strong peaks at Bragg angles $2\theta \pm 0.2°$ of 7.2°, 14.2°, 24.0° and 27.2° in the X-ray diffraction of CuKα with an organic solvent.

3. An oxytitanium phthalocyanine having a crystal form having strong peaks at Bragg angles $2\theta \pm 0.2°$ of 7.4°, 10.9° and 17.9° in the X-ray diffraction of CuKα.

4. An oxytitanium phthalocyanine having a crystal form having strong peaks at Bragg angles $2\theta \pm 0.2°$ of 7.6°, 9.7°, 12.7°, 16.2° and 26.4° in the X-ray diffraction of CuKα.

5. An oxytitanium phthalocyanine having a crystal form having strong peaks at Bragg angles $2\theta \pm 0.2°$ of 8.5°, 10.2° in the X-ray diffraction of CuKα.

6. An electrophotographic photosensitive member, which comprises an electroconductive support and a photosensitive layer laid on the support, the photosensitive layer containing an oxytitanium phthalocyanine of crystal form having strong peaks at Bragg angles $2\theta \pm 0.2°$ of 7.4°, 10.9° and 17.9° in the X-ray diffraction of CuKα.

7. An electrophotographic photosensitive member, which comprises an electroconductive support and a photosensitive layer laid on the support, the photosensitive layer containing an oxytitanium phthalocyanine of crystal form having strong peaks at Bragg angles $2\theta \pm 0.2°$ of 7.6°, 9.7°, 12.7°, 16.2° and 26.4° in the X-ray diffraction of CuKα.

8. An electrophotographic photosensitive member, which comprises an electroconductive support and a photosensitive layer laid on the support, the photosensitive layer containing an oxytitanium phthalocyanine of crystal form having strong peaks at Bragg angles $2\theta \pm 0.2°$ of 8.5°, 10.2° and 10.5° in the X-ray diffraction of CuKα.

9. An electrophotographic photosensitive member according to claim 6, wherein the photosensitive layer is a single layer.

10. An electrophotographic photosensitive member according to claim 6, wherein the photosensitive layer has a charge generation layer containing a charge generation material and a charge transport layer containing a charge transport material.

11. An electrophotographic photosensitive member according to claim 6, wherein an intermediate layer is provided between the electroconductive support and the photosensitive layer.

12. An electrophotographic photosensitive member according to claim 6, wherein a protective layer is further provided on the photosensitive layer.

13. An electrophotographic apparatus unit, which comprises a unit composed of an integral combination of at least one of a charging means, a developing means and a cleaning means with an electrophotographic photosensitive member comprising an electroconductive support and a photosensitive layer laid on the support, the photosensitive layer containing an oxytitanium phthalocyanine of crystal form having strong peaks at Bragg angles $2\theta \pm 0.2°$ of 7.4°, 10.9° and 17.9° in the X-ray diffraction of CuKα, and the unit being detachable from an electrophotographic apparatus proper.

14. An electrophotographic apparatus, which comprises an electrophotographic photosensitive member, a means for forming an electrostatic latent image, a means for developing the electrostatic image and a means for transferring the developed image onto a transfer material, the electrophotographic photosensitive member comprising an electroconductive support and a photosensitive layer laid on the support, and the photosensitive layer containing an oxytitanium phthalocyanine of crystal form having strong peaks at Bragg angles $2\theta \pm 0.2°$ of 7.4°, 10.9° and 17.9° in the X-ray diffraction of CuKα.

15. A facsimile which comprises an electrophotographic apparatus and a receiving means for receiving image information from a remote terminal, the electrophotographic apparatus having an electrophotographic photosensitive member comprising an electroconductive support and a photosensitive layer laid on the support, the photosensitive layer containing an oxytitanium phthalocyanine of crystal form having strong peaks at Bragg angles $2\theta \pm 0.2°$ of 7.4°, 10.9° and 17.9° in the X-ray diffraction of CuKα.

16. An electrophotographic photosensitive member according to claim 7, wherein the photosensitive layer is a single layer.

17. An electrophotographic photosensitive member according to claim 7, wherein the photosensitive layer has a charge generation layer containing a charge generation material and a charge transport layer containing a charge transport material.

18. An electrophotographic photosensitive member according to claim 7, wherein an intermediate layer is provided between the electroconductive support and the photosensitive layer.

19. An electrophotographic photosensitive member according to claim 7, wherein a protective layer is further provided on the photosensitive layer.

20. An electrophotographic apparatus unit, which comprises a unit composed of an integral combination of at least one of a charging means, a developing means and a cleaning means with an electrophotographic photosensitive member comprising an electroconductive support and a photosensitive layer laid on the support, the photosensitive layer containing an oxytitanium phthalocyanine of crystal form having strong peaks at Bragg angles $2\theta \pm 0.2°$ of 7.6°, 9.7°, 12.7°, 16.2° and 26.4° in the X-ray diffraction of CuKα, and the unit being detachable from an electrophotographic apparatus proper.

21. An electrophotographic apparatus, which comprises an electrophotographic photosensitive member, a means for forming an electrostatic latent image, a means for developing the electrostatic image and a means for transferring the developed image onto a transfer material, the electrophotographic photosensitive member comprising an electroconductive support and a photosensitive layer laid on the support, the photosensitive layer containing an oxytitanium phthalocyanine on crystal form having strong peaks at Bragg angles $2\theta \pm 0.2°$ of 7.6°, 9.7°, 12.7°, 16.2° and 26.4° in the X-ray diffraction of CuKα.

22. A facsimile, which comprises an electrophotographic apparatus and a receiving means for receiving image information from a remote terminal the electrophotographic apparatus having an electrophotographic photosensitive member comprising an electroconductive support and a photosensitive layer laid on the support, the photosensitive layer containing an oxytitanium phthalocyanine of crystal form having strong peaks at Bragg angles $2\theta \pm 0.2°$ of 7.6°, 9.7°, 12.7°, 16.2° and 26.4° in the X ray diffraction of CuKα.

23. An electrophotographic photosensitive member according to claim 8, wherein the photosensitive layer is a single layer.

24. An electrophotographic photosensitive member according to claim 8, wherein the photosensitive member has a charge generation layer containing a charge generation material and a charge transport layer containing a charge transport material.

25. An electrophotographic photosensitive member according to claim 8, wherein an intermediate layer is provided between the electroconductive support and the photosensitive layer.

26. An electrophotographic photosensitive member according to claim 8, wherein a protective layer is further provided on the photosensitive layer.

27. An electrophotographic apparatus unit, which comprises a unit composed of an integral combination of at least one of a charging means, a developing means and a cleaning means with an electrophotographic photosensitive member comprising an electroconductive support and a photosensitive layer laid on the support, the photosensitive layer containing an oxytitanium phthalocyanine of crystal form having strong peaks at Bragg angles $2\theta \pm 0.2°$ of 8.5°, 10.2° and 10.5° in the X-ray diffraction of CuKα, and the unit being detachable from an electrophotographic apparatus proper.

28. An electrophotographic apparatus which comprises an electrophotographic photosensitive member, a means for forming an electrostatic latent image, a means for developing the electrostatic image and a means for transferring the developed image onto a transfer material, the electrophotographic photosensitive member comprising an electroconductive support and a photosensitive layer laid on the support, the photosensitive layer containing an oxytitanium phthalocyanine of crystal form having strong peaks at Bragg angles $2\theta \pm 0.2°$ of 8.5°, 10.2° and 10.5° in the X-ray diffraction of CuKα.

29. A facsimile, which comprises an electrophotographic apparatus and a receiving means for receiving image information from a remote terminal, the electrophotographic apparatus having an electrophotographic photosensitive member comprising an electroconductive support and a photosensitive layer laid on the support, the photosensitive layer containing an oxytitanium phthalocyanine of crystal form having strong peaks at Bragg angles $2\theta \pm 0.2°$ of 8.5°, 10.2° and 10.5° in the X-ray diffraction of CuKα.

* * * * *

UNITED STATES PATENT AND TRADEMARK OFFICE
CERTIFICATE OF CORRECTION

PATENT NO. : 5,194,354
DATED : March 16, 1993
INVENTOR(S) : HIDEYUKI TAKAI, ET AL.

It is certified that error appears in the above-identified patent and that said Letters Patent is hereby corrected as shown below:

ON THE TITLE PAGE:

IN [57] ABSTRACT

Line 6, "member" should read --members--.
Line 11, "ver" should read --very--.

SHEET 8 OF 14

FIG. 15, "GRAND" (both occurrences) should read --GROUND--.

SHEET 11 OF 14

FIG. 19, "GRAND" (both occurrences) should read --GROUND--.

COLUMN 1

Line 50, "non-metalphthalocyanines" should read
--non-metal phthalocyanines--.

COLUMN 2

Line 31, "Further" should read --A further--.
Line 36, "electropbotographic" should read
--electrophotographic--.
Line 57, "X ray" should read --X-ray--.

COLUMN 3

Line 64, "pbotosensitive" should read --photosensitive--.

UNITED STATES PATENT AND TRADEMARK OFFICE
CERTIFICATE OF CORRECTION

PATENT NO. : 5,194,354
DATED : March 16, 1993
INVENTOR(S) : HIDEYUKI TAKAI, ET AL.

It is certified that error appears in the above-identified patent and that said Letters Patent is hereby corrected as shown below:

COLUMN 5

Line 29, "metbyl" should read --methyl--.

COLUMN 6

Line 31, "electropbotograpbic" should read
       --electrophotographic--.
   Line 68, "54 µm." should read --5 µm.--.

COLUMN 8

Line 3, "pbotosensitive" should read --photosensitive--.
   Line 47, "conrolled" should read --controlled--.
   Line 59, "image" should read --images--.

COLUMN 9

Line 18, "Stop angle (20θ): 40 deg." should read
       --Stop angle (2θ): 40 deg.--.
   Line 27, "4.Cg" should read --4.0 g--.

COLUMN 10

Line 10, "Production Example 2" should read
       --¶ PRODUCTION EXAMPLE 2--.

COLUMN 12

Line 34, "pbenol" should read --phenol--.
   Line 61, "Was" should read --was--.

UNITED STATES PATENT AND TRADEMARK OFFICE
CERTIFICATE OF CORRECTION

PATENT NO. : 5,194,354

DATED : March 16, 1993

INVENTOR(S) : HIDEYUKI TAKAI, ET AL.

It is certified that error appears in the above-identified patent and that said Letters Patent is hereby corrected as shown below:

COLUMN 13

Line 35, "phthaoyanine" should read --phthalocyanine--.
Line 51, "changing" should read --charging--.

COLUMN 16

Line 25, "phthalocyanin" should read --phthalocyanine--.
Line 32, "Example" should read --Examples--.
Line 50, "electrophotograpbic" should read --electrophotographic--.

COLUMN 17

Line 28, "pbotosensitive" should read --photosensitive--.
Line 58, "electropbotographic" should read --electrophotographic--.

COLUMN 18

Line 14, "pbotosensitive" should read --photosensitive--.
Line 49, "phthal ocyanine" should read --phthalocyanine--.

COLUMN 19

Line 24, "10.2°" should read --10.2° and 10.5°--.

UNITED STATES PATENT AND TRADEMARK OFFICE
CERTIFICATE OF CORRECTION

PATENT NO. : 5,194,354
DATED : March 16, 1993
INVENTOR(S) : HIDEYUKI TAKAI, ET AL.

It is certified that error appears in the above-identified patent and that said Letters Patent is hereby corrected as shown below:

<u>COLUMN 20</u>

Line 62, "on" should read --of--.
    Line 68, "terminal should read --terminal,--.

Signed and Sealed this

Fifteenth Day of February, 1994

Attest:

BRUCE LEHMAN

Attesting Officer      Commissioner of Patents and Trademarks